(12) United States Patent
Mizuhashi et al.

(10) Patent No.: US 12,681,614 B2
(45) Date of Patent: Jul. 14, 2026

(54) SENSOR APPARATUS, INTEGRATED CIRCUIT, AND METHOD OF DETECTING INDICATOR USING LINEAR ELECTRODES AND DETECTION COILS

(71) Applicant: Wacom Co., Ltd., Saitama (JP)

(72) Inventors: Hiroshi Mizuhashi, Saitama (JP); Fumitaka Goto, Saitama (JP); Joo Hoon Lee, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/968,902

(22) Filed: Dec. 4, 2024

(65) Prior Publication Data

US 2025/0094011 A1    Mar. 20, 2025

Related U.S. Application Data

(63) Continuation of application No. PCT/JP2023/015528, filed on Apr. 18, 2023.

(30) Foreign Application Priority Data

Jun. 6, 2022    (JP) ................................. 2022-091360

(51) Int. Cl.
G06F 3/046        (2006.01)
G01D 5/22         (2006.01)
G06F 3/041        (2006.01)

(52) U.S. Cl.
CPC ........... G06F 3/046 (2013.01); G01D 5/2208 (2013.01); G06F 3/04162 (2019.05); G06F 3/04164 (2019.05); G06F 3/04166 (2019.05)

(58) Field of Classification Search
CPC .. G06F 3/046; G06F 3/04164; G06F 3/04162; G01D 5/2208
See application file for complete search history.

(56) References Cited

U.S. PATENT DOCUMENTS

2017/0357368 A1 * 12/2017 Katsuta ............... G06F 3/04166

FOREIGN PATENT DOCUMENTS

| JP | 2017220153 | A | 12/2017 |
| JP | 6698386 | B2 | 5/2020 |
| JP | 2022012385 | A | 1/2022 |

OTHER PUBLICATIONS

International Search Report, dated Jul. 18, 2023, for International Application PCT/JP2023/015528. (2 pages) (English translation).

* cited by examiner

*Primary Examiner* — Lisa S Landis
(74) *Attorney, Agent, or Firm* — Seed Intellectual Property Law Group LLP

(57)            ABSTRACT

A sensor apparatus includes: a linear electrode group extended in parallel; a loop coil group crossing the linear electrode group; and a sensor controller. The sensor controller is configured to sequentially send alternating magnetic fields from the linear electrode group, use the loop coil group to detect an alternating magnetic field generated by an indicator according to the alternating magnetic fields, determine a linear electrode set including part of the linear electrode group based on a result of detecting the a alternating magnetic field, execute a process of generating alternating magnetic fields in at least a part of the linear electrode set for a plurality of times, use a plurality of result values detected by at least the part of the loop coil group as a result of the execution to derive a two-dimensional position of the indicator, and update the linear electrode set according to the two-dimensional position.

7 Claims, 28 Drawing Sheets

F I G . 1
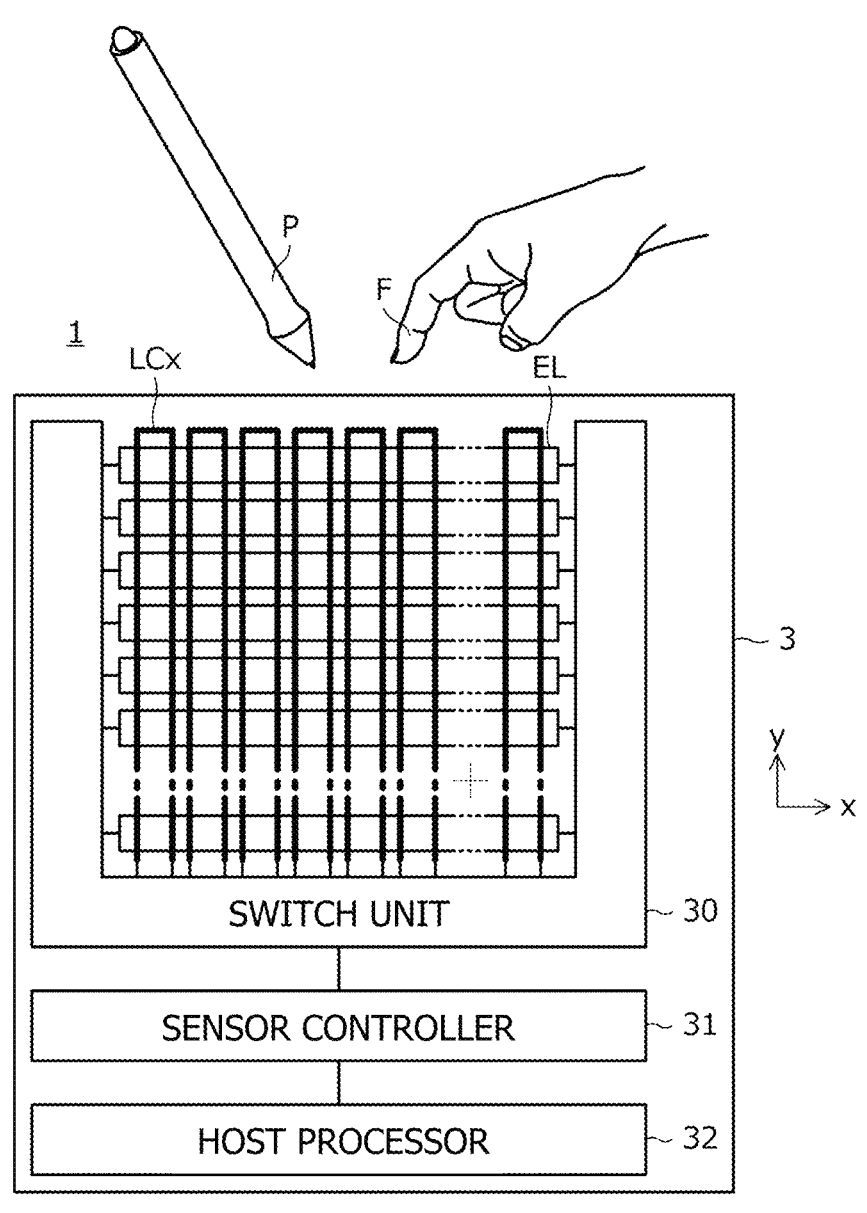

F I G . 7 A
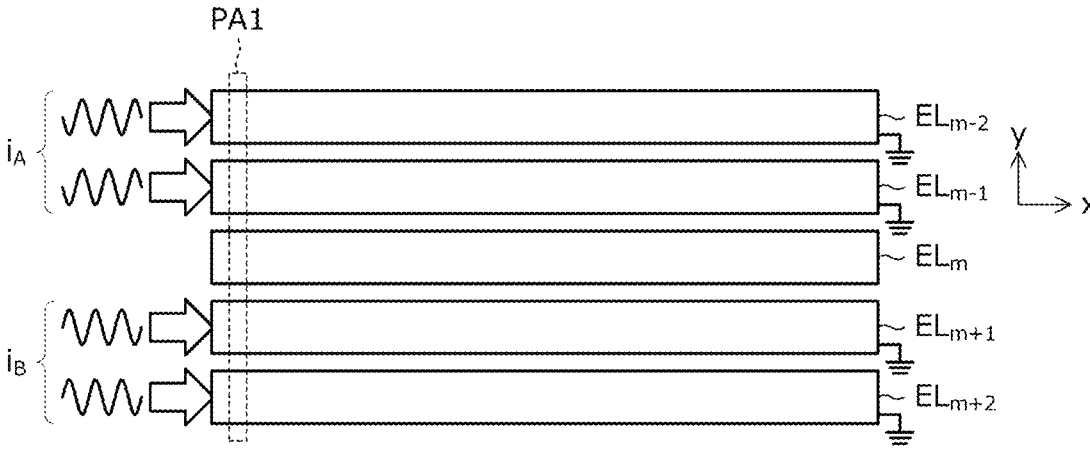
F I G . 7 B
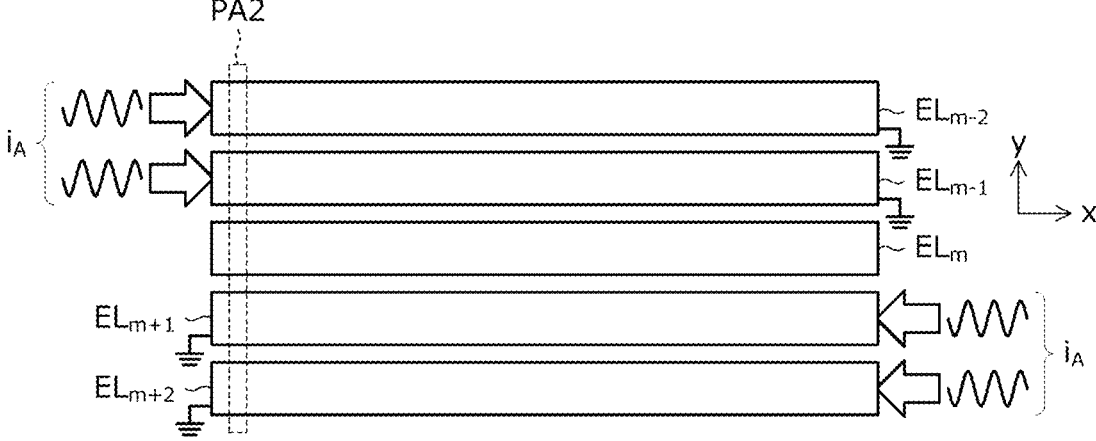

F I G . 8 A
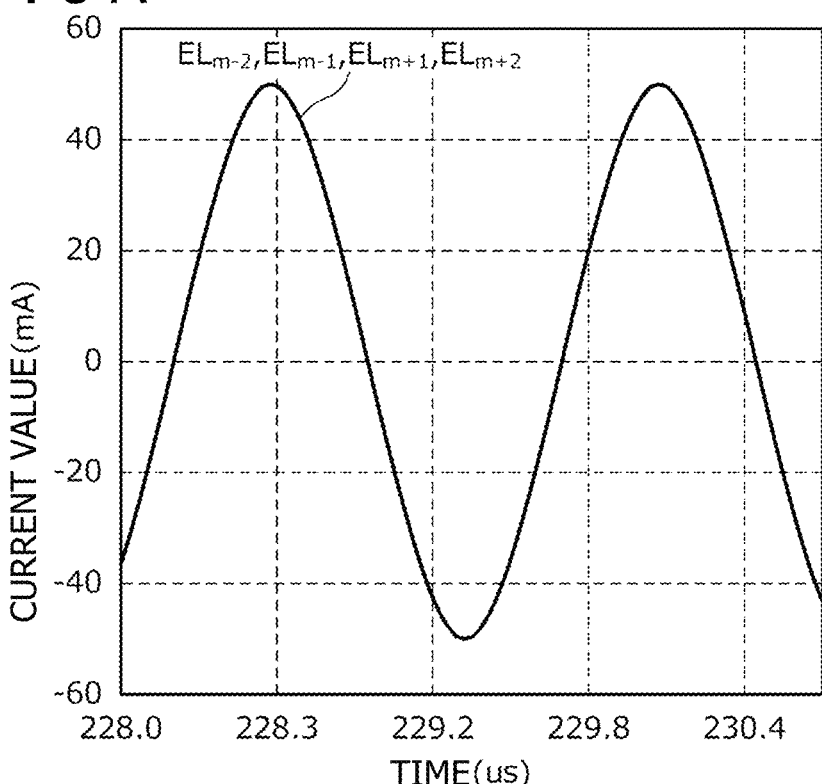
F I G . 8 B
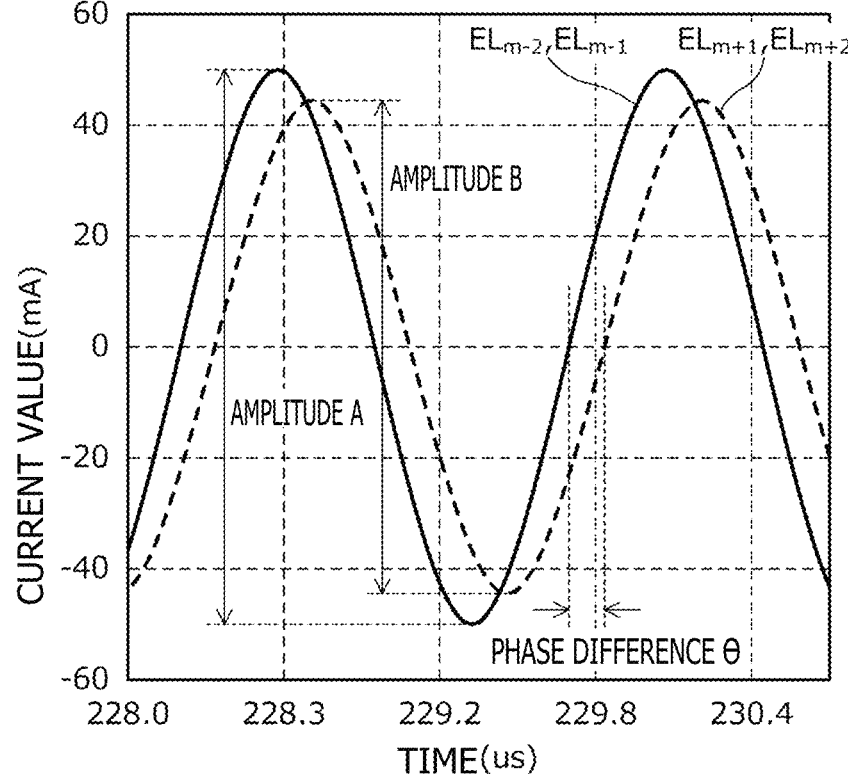

F I G . 1 4
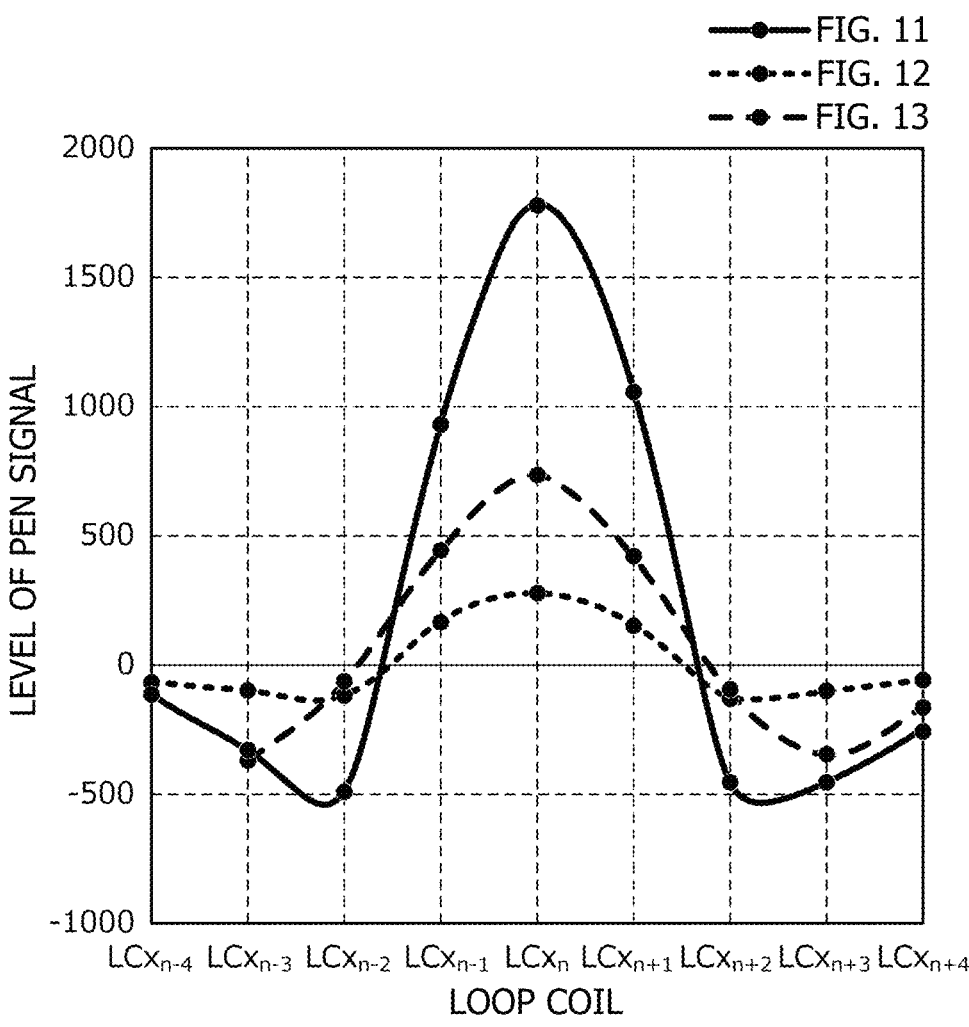

F I G . 1 7
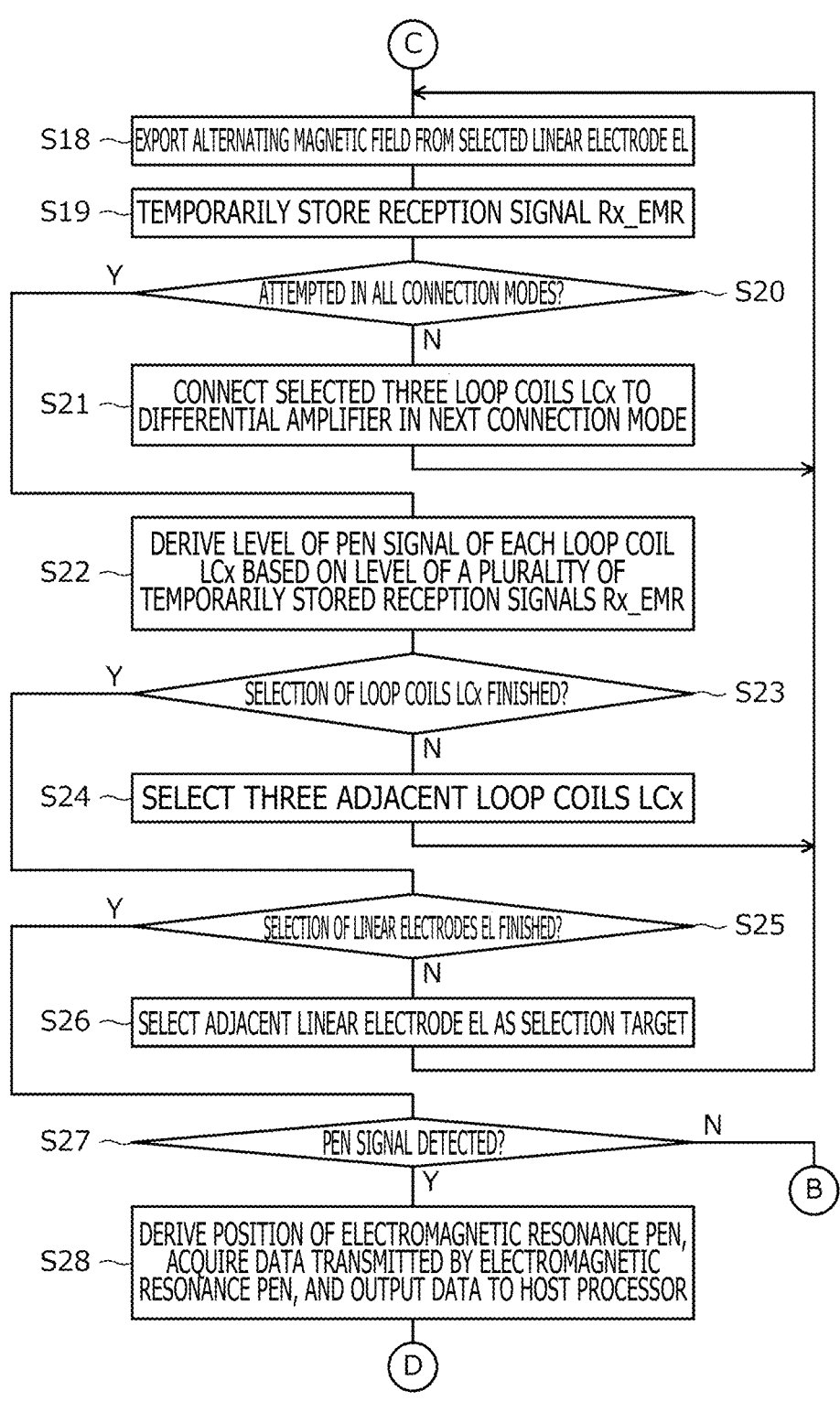

F I G . 2 1
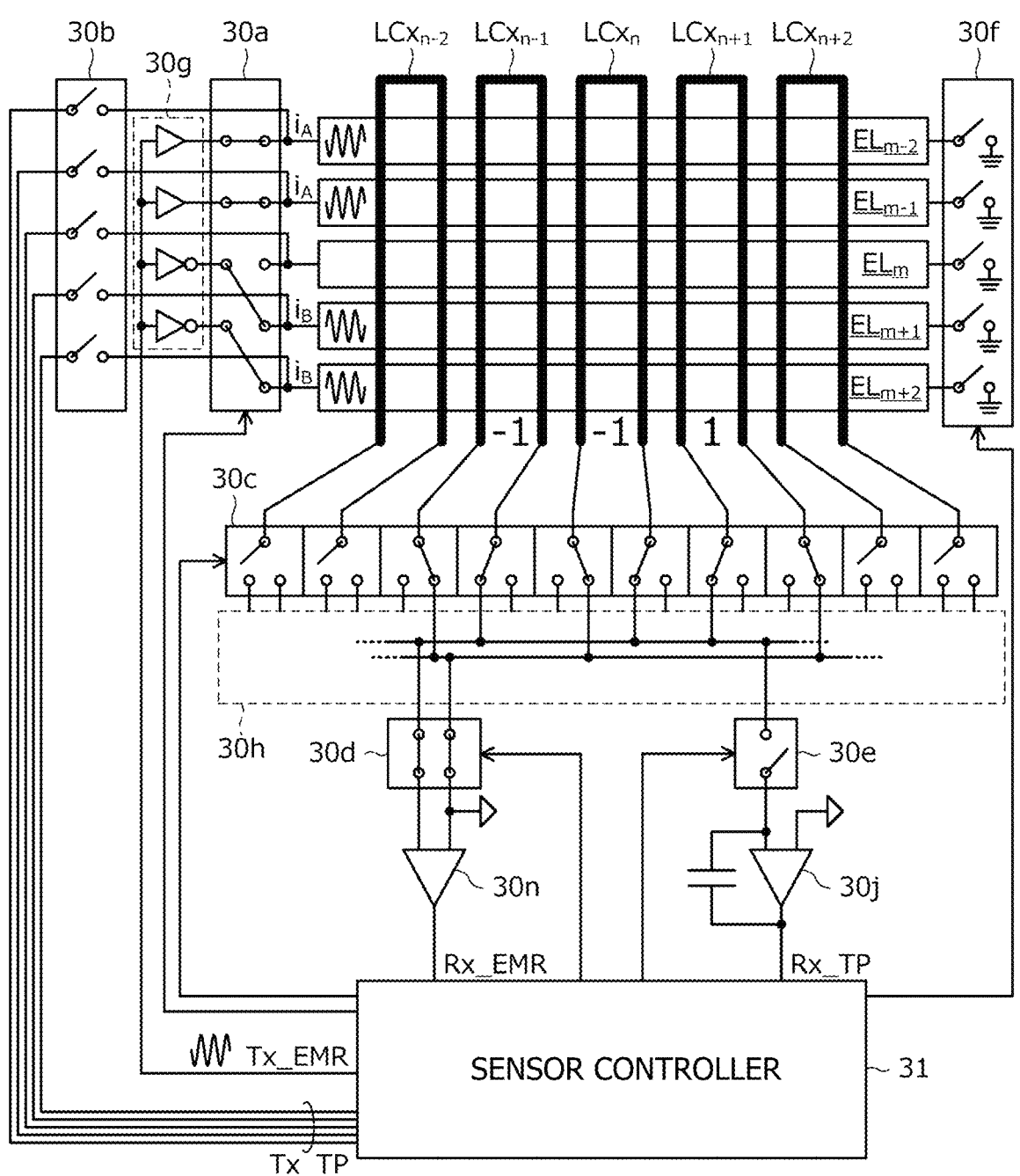

F I G . 2 6
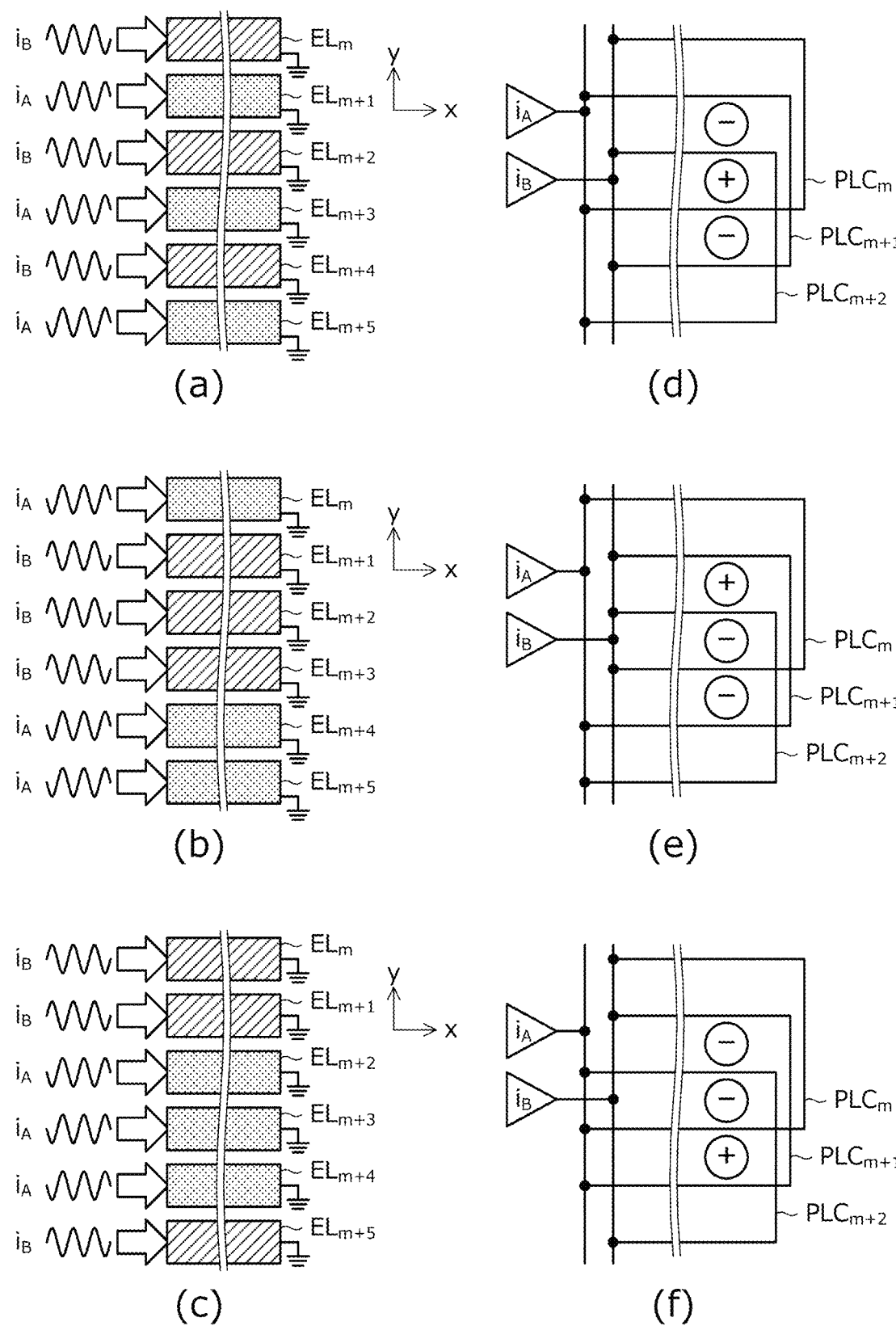
(a)
(b)
(c)
(d)
(e)
(f)

F I G . 2 8
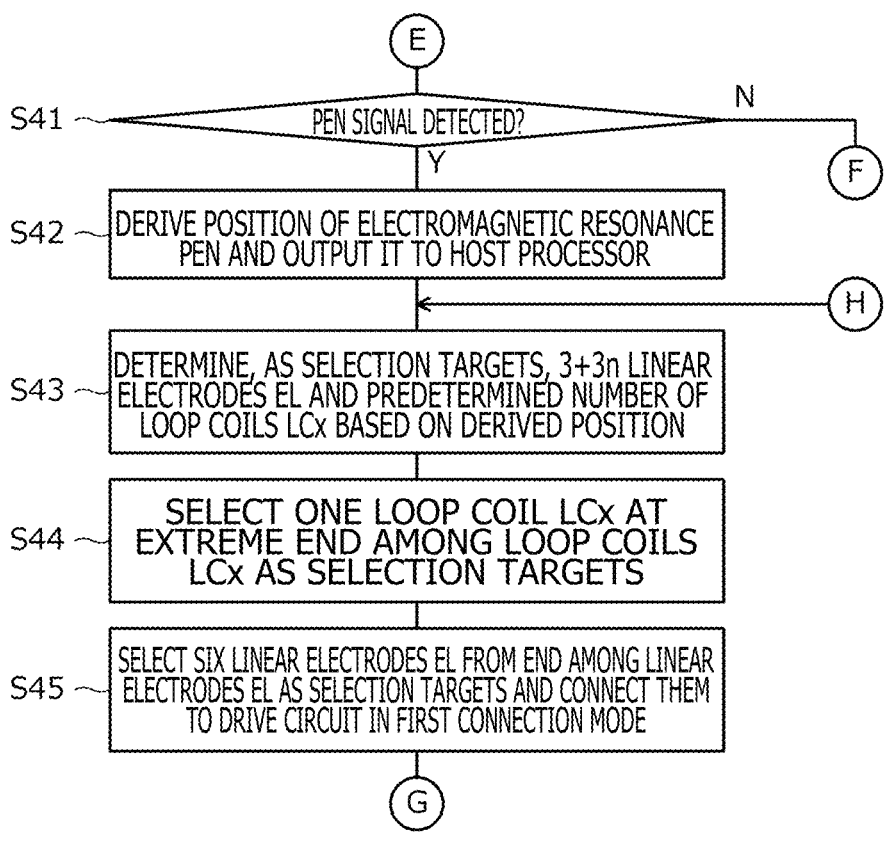

SENSOR APPARATUS, INTEGRATED CIRCUIT, AND METHOD OF DETECTING INDICATOR USING LINEAR ELECTRODES AND DETECTION COILS

BACKGROUND

Technical Field

The present disclosure relates to a sensor apparatus, an integrated circuit, and a method of detecting an indicator.

Description of the Related Art

An electromagnetic resonance system (EMR system) is known as a system for detecting a position of an electromagnetic resonance pen in a panel surface of a tablet terminal or the like. The tablet terminal of EMR system includes a sensor (hereinafter, referred to as an "EMR sensor") for detecting the pen arranged in the panel surface and a sensor controller connected to the EMR sensor. The EMR sensor includes a plurality of Tx coils lined up and arranged in a y direction and a plurality of Rx coils lined up and arranged in an x direction. The sensor controller sequentially exports alternating magnetic fields from the plurality of Tx coils, and at each time, each Rx coil receives a reflection signal (hereinafter, referred to as a "pen signal") transmitted by the electromagnetic resonance pen. In this way, the sensor controller detects the position of the electromagnetic resonance pen and receives data transmitted by the electromagnetic resonance pen.

An example of the EMR sensor is disclosed in Patent Literature 1. In the EMR sensor described in Patent Literature 1, drive electrodes in a display apparatus (linear electrodes supplied with drive signals for display) are used as Tx coils, and signal lines in the display apparatus (wires supplied with image signals) are used as Rx coils to suppress rise in price. Generation of the alternating magnetic fields by the drive electrodes is executed by using a selection signal to select two drive electrodes, applying a current from one end to another end of one of the drive electrodes, and applying the same current from another end to one end of the other drive electrode. In Patent Literature 1, the drive electrodes and the signal lines in the display apparatus are also used as touch electrodes for detecting a finger by a capacitance system.

PRIOR ART DOCUMENT

Patent Document

Patent Literature 1: Japanese Patent No. 6698386

BRIEF SUMMARY

Technical Problem

Incidentally, a current with a larger amplitude than a drive signal for display or the like needs to be applied to the Tx coil of the EMR sensor to generate a magnetic field in a required size. When such a large current is supplied to the linear electrode substituting the Tx coil, the power consumption increases because direct current (DC) resistance of the linear electrode is larger than that of the general Tx coil. Therefore, a technique that can prevent the increase in power consumption even when the linear electrodes substitute the Tx coils is necessary.

Therefore, embodiments of the present disclosure provide a sensor apparatus that can prevent an increase in power consumption even when linear electrodes substitute Tx coils.

In addition, when the alternating magnet fields are generated by using the selection signal to select two linear electrodes, applying the current from one end to the other end of one of the linear electrodes, and applying the same current from the other end to one end of the other linear electrode as in the disclosure described in Patent Literature 1, a phase shift occurs between the two linear electrodes. As a result, noise is superimposed on the magnetic field detected by the Rx coil, and improvement is necessary.

Accordingly, embodiments of the present disclosure provide a sensor apparatus, an integrated circuit, and a method of detecting an indicator that can reduce noise superimposed on a magnetic field detected by an Rx coil when linear electrodes substitute Tx coils.

Technical Solution

An aspect of the present disclosure provides a sensor apparatus that detects an indicator, the sensor apparatus including a linear electrode group extended in parallel, a detection coil group crossing the linear electrode group, and an integrated circuit connected to the linear electrode group and the detection coil group, in which the integrated circuit, in operation, sequentially sends alternating magnetic fields from the linear electrode group, uses the detection coil group to detect an alternating magnetic field generated by the indicator according to the alternating magnetic fields, and determines a linear electrode set including part of the linear electrode group based on a result of the detection, execute a process of exporting alternating magnetic fields from at least a part of the linear electrode set for a plurality of times and use a plurality of result values detected by at least a part of the detection coil group as a result of detecting the alternating magnetic field generated by the indicator to derive a two-dimensional position of the indicator, and updates the linear electrode set according to the two-dimensional position.

The aspect of the present disclosure provides an integrated circuit connected to a linear electrode group extended in parallel and a detection coil group crossing the linear electrode group, the integrated circuit including at least one processor and at least one memory storing instructions that, when executed by the at least one processor, cause the integrated circuit to: detect an indicator, sequentially send alternating magnetic fields from the linear electrode group, use the detection coil group to detect an alternating magnetic field generated by the indicator according to the alternating magnetic fields, determine a linear electrode set including a part of the linear electrode group based on a result of detecting the alternating magnetic field generated by the indicator, execute a process of sending alternating magnetic fields from at least part of the linear electrode set for a plurality of times and use a plurality of result values detected by at least part of the detection coil group as a result of executing the process to derive a two-dimensional position of the indicator, and update the linear electrode set according to the two-dimensional position.

The aspect of the present disclosure provides a method of detecting an indicator by using a linear electrode group extended in parallel and a detection coil group crossing the linear electrode group, the method including sequentially sending alternating magnetic fields from the linear electrode group, using the detection coil group to detect an alternating magnetic field generated by the indicator according to the alternating magnetic fields, determining a linear electrode set including a part of the linear electrode group based on a result of detecting the alternating magnetic field, executing a process of sending alternating magnetic fields from at least a part of the linear electrode set for a plurality of times, using a plurality of result values detected by at least a part of the detection coil group as a result of the executing the process to derive a two-dimensional position of the indicator, and updating the linear electrode set according to the two-dimensional position.

Another aspect of the present disclosure provides a sensor apparatus that detects an indicator, the sensor apparatus including a linear electrode group extended in parallel, a detection coil group crossing the linear electrode group, and an integrated circuit connected to the linear electrode group and the detection coil group, in which the integrated circuit, in operation: supplies a first alternating current to one end in a longitudinal direction of one or more first linear electrodes in the linear electrode group and supplies a second alternating current to the one end in the longitudinal direction of one or more second linear electrodes different from the first linear electrodes in the linear electrode group, and the first alternating current and the second alternating current are generated to satisfy a relation that phases of time derivatives of the first alternating current and the second alternating current are opposite.

The other aspect of the present disclosure provides an integrated circuit connected to a linear electrode group extended in parallel and a detection coil group crossing the linear electrode group, the integrated circuit, in operation, detects an indicator, supplies a first alternating current to one end in a longitudinal direction of one or more first linear electrodes in the linear electrode group, and supplies a second alternating current to the one end in the longitudinal direction of one or more second linear electrodes different from the one or more first linear electrodes in the linear electrode group, in which the first alternating current and the second alternating current are generated to satisfy a relation that phases of time derivatives of the first alternating current and the second alternating current are opposite.

The other aspect of the present disclosure provides a method of detecting an indicator by using a linear electrode group extended in parallel and a detection coil group crossing the linear electrode group, the method including: generating a first alternating current, generating a second alternating current satisfying a relation that phases of time derivatives of the first alternating current and the second alternating current are opposite, supplying the first alternating current to one end in a longitudinal direction of one or more first linear electrodes in the linear electrode group, and supplying the second alternating current to one end in the longitudinal direction of one or more second linear electrodes different from the one or more first linear electrodes in the linear electrode group.

Advantageous Effects

According to the sensor apparatus, the integrated circuit, and the method of detecting the indicator of the aspect of the present disclosure, after the linear electrode set is specified once, the two-dimensional position of the indicator can be derived by supplying the currents to only the predetermined number of linear electrodes included in the linear electrode set. Therefore, the increase in power consumption can be prevented even when the linear electrodes substitute the Tx coils.

According to the sensor apparatus, the integrated circuit, and the method of detecting the indicator of the other aspect of the present disclosure, occurrence of the phase shift between two linear electrodes can be prevented. Therefore, the noise superimposed on the magnetic fields detected by the Rx coils can be reduced when the linear electrodes substitute the Tx coils.

BRIEF DESCRIPTION OF THE SEVERAL VIEWS OF THE DRAWINGS

FIG. 1 is a diagram illustrating a configuration of a position detection system 1 according to a first embodiment of the present disclosure.

FIG. 7A is a diagram illustrating a method of supplying alternating currents to linear electrodes EL according to the present embodiment, and FIG. 7B is a diagram illustrating a method of supplying the alternating current according to a comparative example.

FIG. 8A is a diagram illustrating a result of measuring the currents flowing through the linear electrodes EL in a probing area PA1 illustrated in FIG. 7A, and FIG. 8B is a diagram illustrating a result of measuring the currents flowing through the linear electrodes EL in a probing area PA2 illustrated in FIG. 7B.

FIG. 14 is a diagram illustrating results of simulating levels of the pen signal received by loop coils LCx near a loop coil $LCx_n$ when the electromagnetic resonance pen P is positioned on the loop coil $LCx_n$.

FIG. 17 is a flow diagram illustrating the entire flow of the position detection of the electromagnetic resonance pen P executed by the sensor controller 31.

FIG. 21 is a diagram illustrating a state of the switch unit 30 when the sensor controller 31 detects the position of the electromagnetic resonance pen P.

FIGS. 26($a$) to 26($c$) are diagrams schematically illustrating methods of supplying the alternating currents in FIGS. 23 to 25, respectively, and FIGS. 26($d$) to 26($f$) are diagrams illustrating equivalent circuits when the methods illustrated in FIGS. 26($a$) to 26($c$) are used to supply alternating currents $i_A$ and $i_B$ is to six linear electrodes $EL_m$ to $EL_{m+5}$, respectively.

FIG. 28 is a flow diagram illustrating the entire flow of the position detection of the electromagnetic resonance pen P executed by the sensor controller 31.

DETAILED DESCRIPTION

Figure 2:
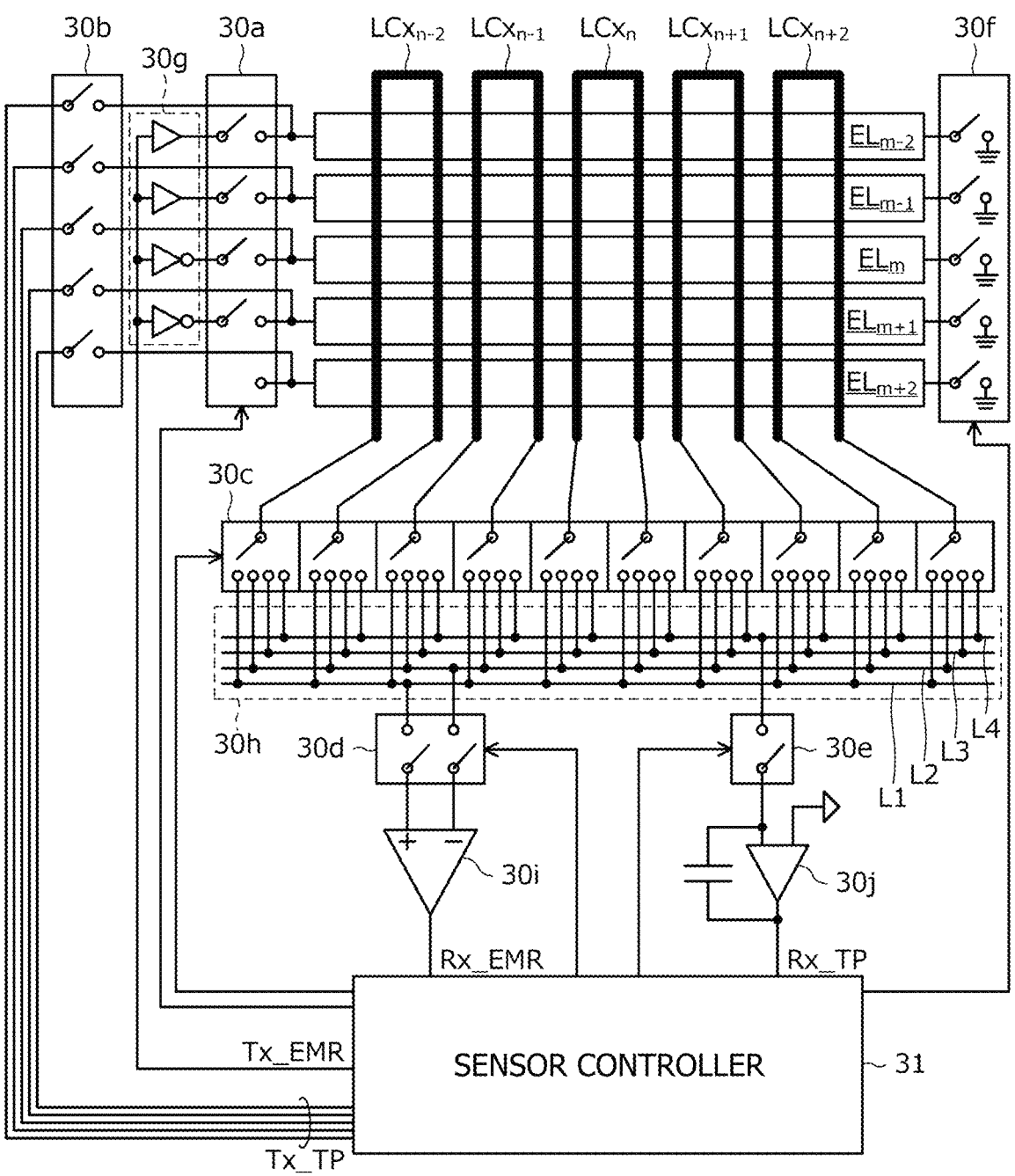
FIG. 2 is a diagram illustrating an internal configuration of a switch unit 30 illustrated in FIG. 1.

Hereinafter, embodiments of the present disclosure will be described in detail with reference to the attached drawings.

FIG. 1 is a diagram illustrating a configuration of a position detection system 1 according to a first embodiment of the present disclosure. As illustrated in FIG. 1, the position detection system 1 includes an electromagnetic resonance pen P and a position detection apparatus 3. Of these, the electromagnetic resonance pen P is a pen (indicator) corresponding to position detection based on the EMR system, and the electromagnetic resonance pen P includes a resonant circuit including a coil and a capacitor inside.

The position detection apparatus 3 is an apparatus (sensor apparatus) corresponding to the position detection of the electromagnetic resonance pen P based on the EMR system, and the position detection apparatus 3 includes a plurality of loop coils LCx (detection coil group), a plurality of linear electrodes EL (linear electrode group), a switch unit 30, a sensor controller 31, and a host processor 32. Although typical examples of the position detection apparatus 3 include a tablet terminal and a laptop in which the display surface also serves as the touch surface, the position detection apparatus 3 may be a digitizer or the like not including the display surface.

Illustrated x and y directions are directions in the touch surface, and the x and y directions are orthogonal to each other. The plurality of loop coils LCx are formed to extend in the y direction (first direction) and lined up and arranged in the x direction (second direction). On the other hand, the plurality of linear electrodes EL are formed to extend in the x direction and lined up and arranged in the y direction. Each of the loop coils LCx and each of the linear electrodes EL are connected to the switch unit 30 at both ends.

The switch unit 30 is a set of switches including a plurality of switches for switching the mutual connections of the plurality of loop coils LCx and switching the connections between the plurality of loop coils LCx and the plurality of linear electrodes EL and the sensor controller 31. The switch unit 30 may be provided in a dedicated circuit board or integrated circuit or may be provided in the same integrated circuit as the sensor controller 31. The switch state of the switch unit 30 is controlled by the sensor controller 31.

FIG. 2 is a diagram illustrating an internal configuration of the switch unit 30. For the simplification, FIG. 2 illustrates only five loop coils LCx and five linear electrodes EL (loop coils $LCX_{n-2}$ to $LCX_{n+2}$ and linear electrodes $EL_{m-2}$ to $EL_{m+2}$). This is also similar in FIGS. 3 to 6 and FIGS. 18 to 21 described later. As illustrated in FIG. 2, the switch unit 30 includes five types of switches 30$a$ to 30$f$, a drive circuit 30$g$, a wiring unit 30$h$, a differential amplifier 30$i$, and an op amp 30$j$.

The switch 30$a$ is configured to supply, to the plurality of linear electrodes EL, an alternating current Tx_EMR for generating an alternating magnetic field on the touch surface, and the switch 30$a$ includes four input pins connected to the drive circuit 30$g$ and output pins corresponding to the linear electrodes EL. Each output pin is connected to one end of the corresponding linear electrode EL in the x direction (longitudinal direction). The switch 30$a$ plays a role of connecting each input pin to one of the output pins according to the control of the sensor controller 31.

The drive circuit 30$g$ is a circuit that generates alternating currents $i_A$ and $i_B$ (see FIGS. 4 to 6) according to the alternating current Tx_EMR supplied from the sensor controller 31 and that supplies the alternating currents $i_A$ and $i_B$ is to the linear electrodes EL through the switch 30$a$. The drive circuit 30$g$ is configured to supply the alternating current $i_A$ (first alternating current) to two of the four input pins of the switch 30$a$ and supply the alternating current $i_B$ (second alternating current) to the other two.

The alternating current $i_A$ is, for example, a current generated by using a buffer circuit to amplify the alternating current Tx_EMR. On the other hand, the alternating current $i_B$ is a current generated to satisfy a relation that the phases of the time derivates of the alternating currents $i_A$ and $i_B$ are opposite. The relation can be expressed by a formula as in the following Equation (1). It may be stated that the relation of Equation (1) is a relation that the alternating current $i_B$ decreases with an increase in the alternating current $i_A$, and the alternating current i increases with a decrease in the alternating current $i_A$. It may also be stated that the relation of Equation (1) is a relation that the potential at one end with respect to the other end in the longitudinal direction of each of one or more linear electrodes EL supplied with the alternating current i increases with an increase in the potential at the other end with respect to one end in the longitudinal direction of each of one or more linear electrodes EL supplied with the alternating current $i_A$.

Math. 1

$$\frac{di_A(t)}{dt} = -\frac{di_B(t)}{dt} \qquad (1)$$

A typical alternating current $i_B$ satisfying the relation of Equation (1) is represented by the following Equation (2). Here, A is any constant. When A=0, the alternating current $i_B$ is an inverted signal of the alternating current $i_A$. In this case, the signs of the alternating current $i_A$ and the alternating current $i_B$ are different from each other. On the other hand, when A is larger than the maximum value of the alternating current $i_A$, the alternating current $i_A$ and the alternating current $i_B$ are currents with the same sign and different levels. Note that the inverted signal of the alternating current $i_A$ can be generated by, for example, using an inverting buffer circuit. FIG. 2 illustrates an example of using the inverting buffer circuit.

Math. 2

$$i_B(t) = -i_A(t) + A \qquad (2)$$

It is preferable that the potential at the other end of each of the linear electrodes EL supplied with the alternating currents $i_A$ and is be a potential at the midpoint of the potential generated at one end of the linear electrode EL supplied with the alternating current $i_A$ and the potential generated at one end of the linear electrode EL supplied with the alternating current $i_B$. When A=0, the potential is 0 (that is, ground potential).

The switch 30*b* is configured to supply, to the plurality of linear electrodes EL, a touch detection signal Tx_TP for detecting the position of a finger F, and a set of an input pin and an output pin is provided for each linear electrode EL. The touch detection signal Tx_TP is supplied from the sensor controller 31 to each input pin. Each output pin is connected to the corresponding linear electrode EL. The switch 30*b* plays a roll of connecting each input pin to the corresponding output pin according to the control of the sensor controller 31.

The switch 30*f* is configured to make a switch between a state in which the other end of the linear electrode EL in the x direction (longitudinal direction) is connected to the potential at the midpoint and a floating state in which the other end is not connected to anywhere. FIG. 2 illustrates a case in which the potential at the midpoint is the ground potential, and a set of an input pin and a ground pin is provided for each linear electrode EL in the switch 30*f* in this case as illustrated in FIG. 2. Hereinafter, the description will be continued based on the assumption that the potential at the midpoint is the ground potential.

Each input pin of the switch 30*f* is connected to the other end of the corresponding linear electrode EL in the x direction (longitudinal direction). On the other hand, each ground pin of the switch 30*f* is connected to a ground end supplied with the ground potential. The switch 30*f* is provided because while it is preferable that the other end of each linear electrode EL in the x direction be supplied with the ground potential as described above when the sensor controller 31 detects the position of the electromagnetic resonance pen P, the other end of each linear electrode EL in the x direction needs to be in the floating state when the sensor controller 31 detects the position of the finger F. The switch 30*f* plays a role of switching the connection state between each input pin and the corresponding ground pin according to the control of the sensor controller 31.

The switches 30*c* to 30*e* and the wiring unit 30*h* are configured to supply a pen signal received by each loop coil LCx (signal indicated by the alternating magnetic field generated by the electromagnetic resonance pen P according to the alternating magnetic field generated by the alternating current Tx_EMR) to the differential amplifier 30*i* and supply the touch detection signal Tx_TP received by each loop coil LCx to the op amp 30*j*.

Specifically, first, the switch 30*c* includes input pins corresponding to the end portions of the loop coils LCx, and four output pins are provided for each input pin. The switch 30*c* plays a role of connecting each input pin to one of the four corresponding output pins according to the control of the sensor controller 31.

The wiring unit 30*h* includes four wires L1 to L4. The four output pins for each input pin of the switch 30*c* correspond to the four wires L1 to L4, and the four output pins are connected to the corresponding wires, respectively.

The switch 30*d* is a switch that connects the wire L1 to a non-inverting input terminal of the differential amplifier 30*i* and connects the wire L2 to an inverting input terminal of the differential amplifier 30*i* according to the control of the sensor controller 31. The switch 30*e* is a switch that connects the wire LA to an input terminal of the op amp 30*j* according to the control of the sensor controller 31. The initial state of the switches 30*d* and 30*e* is off (non-connection state).

The differential amplifier 30*i* is a circuit that amplifies a voltage difference between the non-inverting input terminal connected to the wire L1 and the inverting input terminal connected to the wire L2 to generate a reception signal Rx_EMR, and the differential amplifier 30*i* forms a reception circuit of the pen signal along with the sensor controller 31. In addition, the op amp 30*j* is a circuit that amplifies a voltage difference between the input terminal and the ground terminal to generate a reception signal Rx_TP of the capacitance system, and the op amp 30*j* forms a reception circuit of the touch detection signal Tx_TP along with the sensor controller 31. The input terminal of the op amp 30*j* is connected to the wire L4 of the wiring unit 30*h* through the switch 30*c*, and as a result, the reception signal Rx_TP is a signal obtained by amplifying the signal appearing in the wire L4. The op amp 30*j* is provided with a parallel capacitor for removing high frequency noise. Both the reception signal Rx_EMR generated by the differential amplifier 30*i* and the reception signal Rx_TP generated by the op amp 30*j* are supplied to the sensor controller 31.

FIG. 1 will be further described. The sensor controller 31 is an integrated circuit with a function of using the EMR system to detect the position of the electromagnetic resonance pen P in the touch surface and a function of using the capacitance system to detect the position of the finger F on the touch surface. In relation to the electromagnetic resonance pen P, the sensor controller 31 also has a function of demodulating the pen signal transmitted by the electromagnetic resonance pen P to acquire the data transmitted by the electromagnetic resonance pen P. The detection of the position of the electromagnetic resonance pen P and the acquisition of the data from the electromagnetic resonance pen P and the detection of the position of the finger F are executed in time series. The sensor controller 31 is configured to successively supply the detected position and the acquired data to the host processor 32. In one or more implementations, the sensor controller 31 includes at least one processor and at least one memory storing instructions that, when executed by the at least one processor, cause the sensor controller 31 to perform the acts described herein.

The host processor 32 uses the position and the data supplied from the sensor controller 31 to execute processes, such as moving the cursor displayed on the display surface and generating stroke data indicating the trajectory of the electromagnetic resonance pen P or the finger in the touch surface. Of these, in relation to the stroke data, the host processor 32 also executes a process of rendering and displaying the generated stroke data, a process of generating and recording digital ink including the generated stroke data, a process of transmitting the generated digital ink to an external apparatus according to the instruction of the user, and the like.

Hereinafter, the processes of detecting the positions of the electromagnetic resonance pen P and the finger F executed by the sensor controller 31 will be specifically described with reference to FIGS. 3 to 6.

Figure 3:
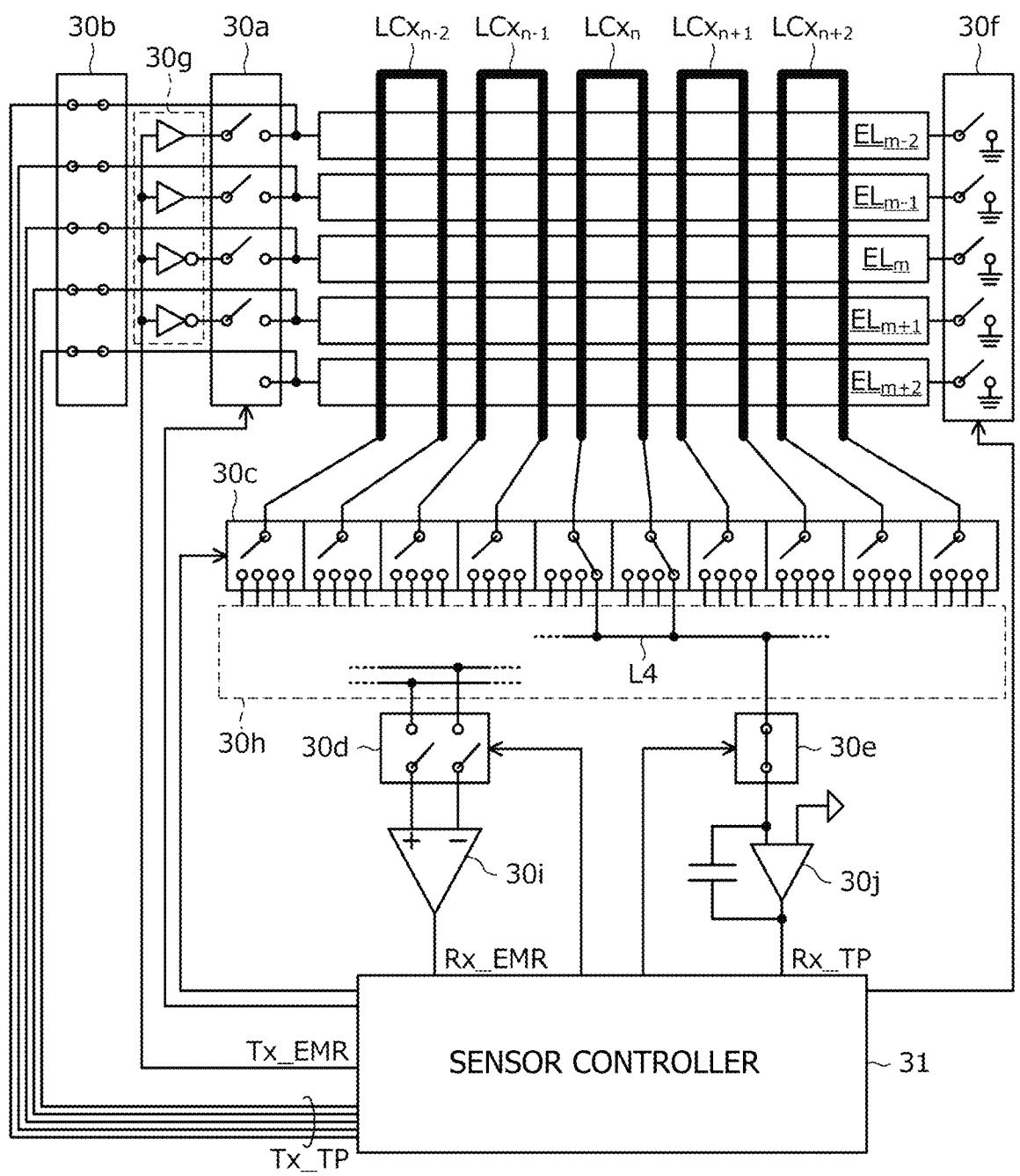
FIG. 3 is a diagram illustrating a state of the switch unit 30 when a sensor controller 31 detects the position of a finger F.

First, FIG. 3 is a diagram illustrating a state of the switch unit 30 when the sensor controller 31 according to the present embodiment detects the position of the finger F. As illustrated in FIG. 3, the sensor controller 31 in this case controls the switch 30*b* to connect the input pins and the corresponding output pins. As a result, the touch detection signal Tx_TP is supplied from the sensor controller 31 to one end of each linear electrode EL in the x direction. In addition, the sensor controller 31 controls the switch 30*f* to cut off the input pins from the corresponding ground pins to put the other end of each linear electrode EL in the x direction into the floating state.

The specific content of the touch detection signal Tx_TP generated by the sensor controller 31 can be represented by a matrix A illustrated in the following Equation (3). The matrix A is a square matrix including a plurality of rows corresponding one-to-one to the plurality of linear electrodes EL. The left side of a subscript attached to each element (such as $A_{11}$) of the matrix A indicates the order of output from the sensor controller 31, and the right side indicates a serial number of the linear electrode EL. M is a total number of the linear electrodes EL. A specific value of each element is either "1" or "−1." Although it is preferable that the matrix A be an orthogonal matrix, the matrix A may not be an orthogonal matrix.

Math. 3

$$A = \begin{pmatrix} A_{11} & A_{21} & A_{31} & \ldots & A_{M1} \\ A_{12} & A_{22} & A_{32} & \ldots & A_{M2} \\ A_{13} & A_{23} & A_{33} & \ldots & A_{M3} \\ \vdots & \vdots & \vdots & & \vdots \\ A_{1M} & A_{2M} & A_{3M} & \ldots & A_{MM} \end{pmatrix} \quad (3)$$

The sensor controller 31 generates the touch detection signal Tx_TP for each column of the matrix A and supplies the touch detection signal Tx_TP to each linear electrode EL. The touch detection signal Tx_TP in a typical example is a binary pulse signal that is high when the corresponding element of the matrix A is 1 and that is low when the element is 1. Hereinafter, the touch detection signal Tx_TP corresponding to one column of the matrix A will be referred to as a "partial touch detection signal Tx_TP."

While the sensor controller 31 supplies one partial touch detection signal Tx_TP to each linear electrode EL, the sensor controller 31 maintains the switch 30*e* in the connection state and executes a process of sequentially connecting the loop coils LCx to the op amp 30*j*. Specifically, the sensor controller 31 controls the switch 30*c* to sequentially connect the loop coils LCx to the wire L4 at both ends. Note that FIG. 3 illustrates an example of a case in which the loop coil $LCx_n$ is connected to the wire LA.

Here, the capacitance formed between an mth linear electrode $EL_m$ and an nth loop coil $LCx_n$ will be represented by $C_{mn}$. When the partial touch detection signal Tx_TP corresponding to the xth column of the matrix A is supplied to each linear electrode EL, and the nth loop coil $LCx_n$ is connected to the op amp 30*j*, the reception signal Rx_TP supplied from the op amp 30*j* to the sensor controller 31 has a value illustrated in the following Equation (4).

Math. 4

$$(A_{x1} \ A_{x2} \ A_{x3} \ \ldots \ A_{xM}) \begin{pmatrix} C_{1n} \\ C_{2n} \\ C_{3n} \\ \vdots \\ C_{Mn} \end{pmatrix} \quad (4)$$

Therefore, the reception signal Rx_TP as a whole obtained for the nth loop coil $LCx_n$ while the partial touch detection signal Tx_TP corresponding to each column of the matrix A is supplied is represented by a vector b illustrated in the following Equation (5).

Math. 5

$$b = A \begin{pmatrix} C_{1n} \\ C_{2n} \\ C_{3n} \\ \vdots \\ C_{Mn} \end{pmatrix} \quad (5)$$

The sensor controller 31 performs calculation on the vector b as illustrated on the left side of the following Equation (6) to separate and acquire the capacitance $C_{mn}$ of each linear electrode EL. Here, a matrix $A^{-1}$ illustrated in Equation (6) is an inverse matrix of the matrix A. As also illustrated in Equation (6), an identity matrix I is obtained by multiplying the matrix A by the matrix $A^{-1}$. Therefore, the sensor controller 31 can perform the calculation to separate and acquire the capacitance $C_{mn}$ at the intersection of the nth loop coil $LCx_n$ and each linear electrode $EL_m$ as illustrated on the right side of Equation (6).

Math. 6

$$A^{-1}b = A^{-1}A \begin{pmatrix} C_{1n} \\ C_{2n} \\ C_{3n} \\ \vdots \\ C_{Mn} \end{pmatrix} = I \begin{pmatrix} C_{1n} \\ C_{2n} \\ C_{3n} \\ \vdots \\ C_{Mn} \end{pmatrix} = \begin{pmatrix} C_{1n} \\ C_{2n} \\ C_{3n} \\ \vdots \\ C_{Mn} \end{pmatrix} \quad (6)$$

The sensor controller 31 executes calculation similar to Equation (6) on each loop coil LCx to derive the capacitance $C_{mn}$ at each intersection of the linear electrode EL and the loop coil LCx. The sensor controller 31 then derives the position (two-dimensional position) of the finger F based on the distribution of the derived capacitance $C_{mn}$ in the touch surface. Specifically, the sensor controller 31 can derive, as the position of the finger F, the position corresponding to the apex of the distribution.

Figure 4:
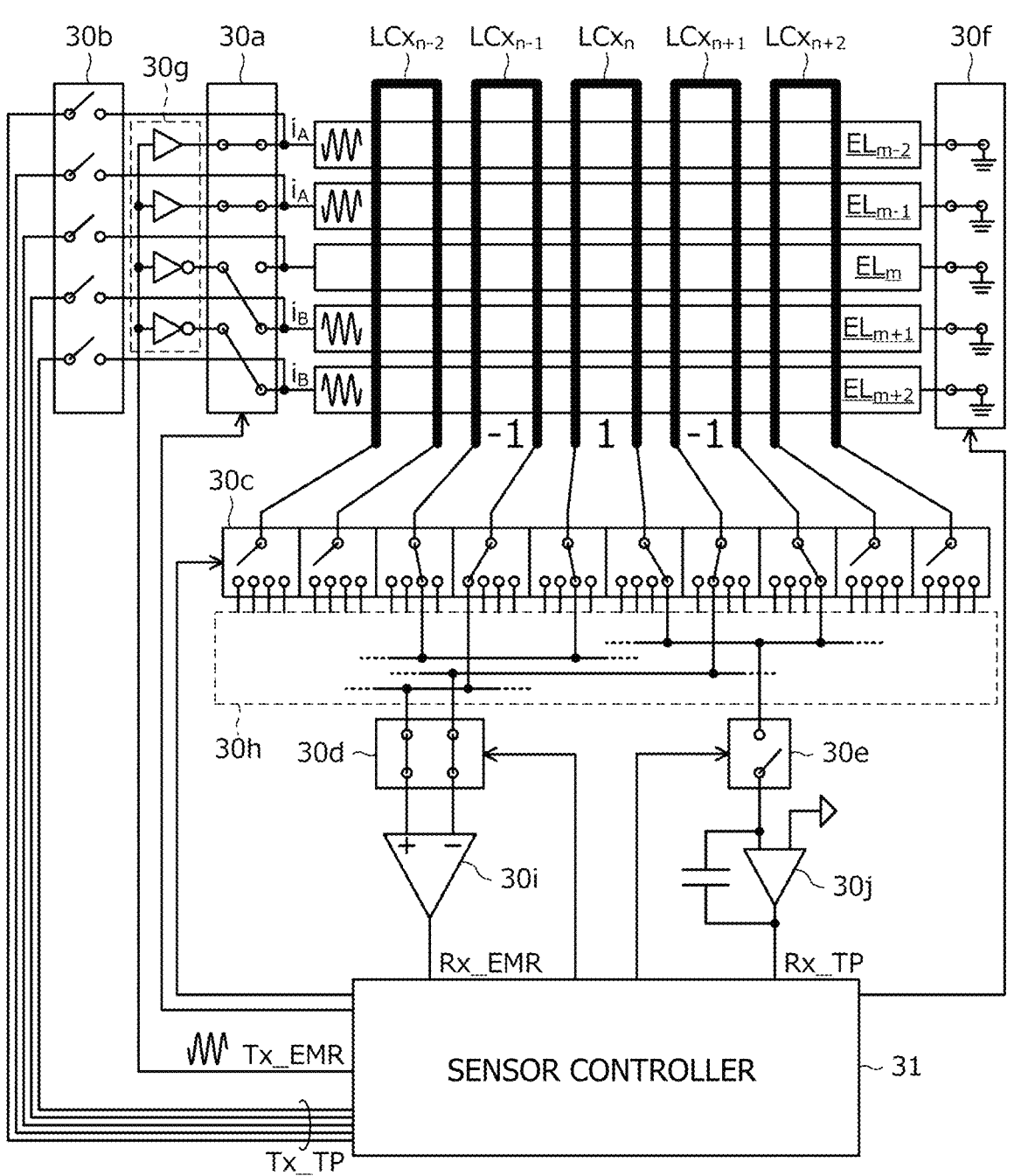
FIG. 4 is a diagram illustrating a state of the switch unit 30 when the sensor controller 31 detects the position of an electromagnetic resonance pen P.
Figure 5:
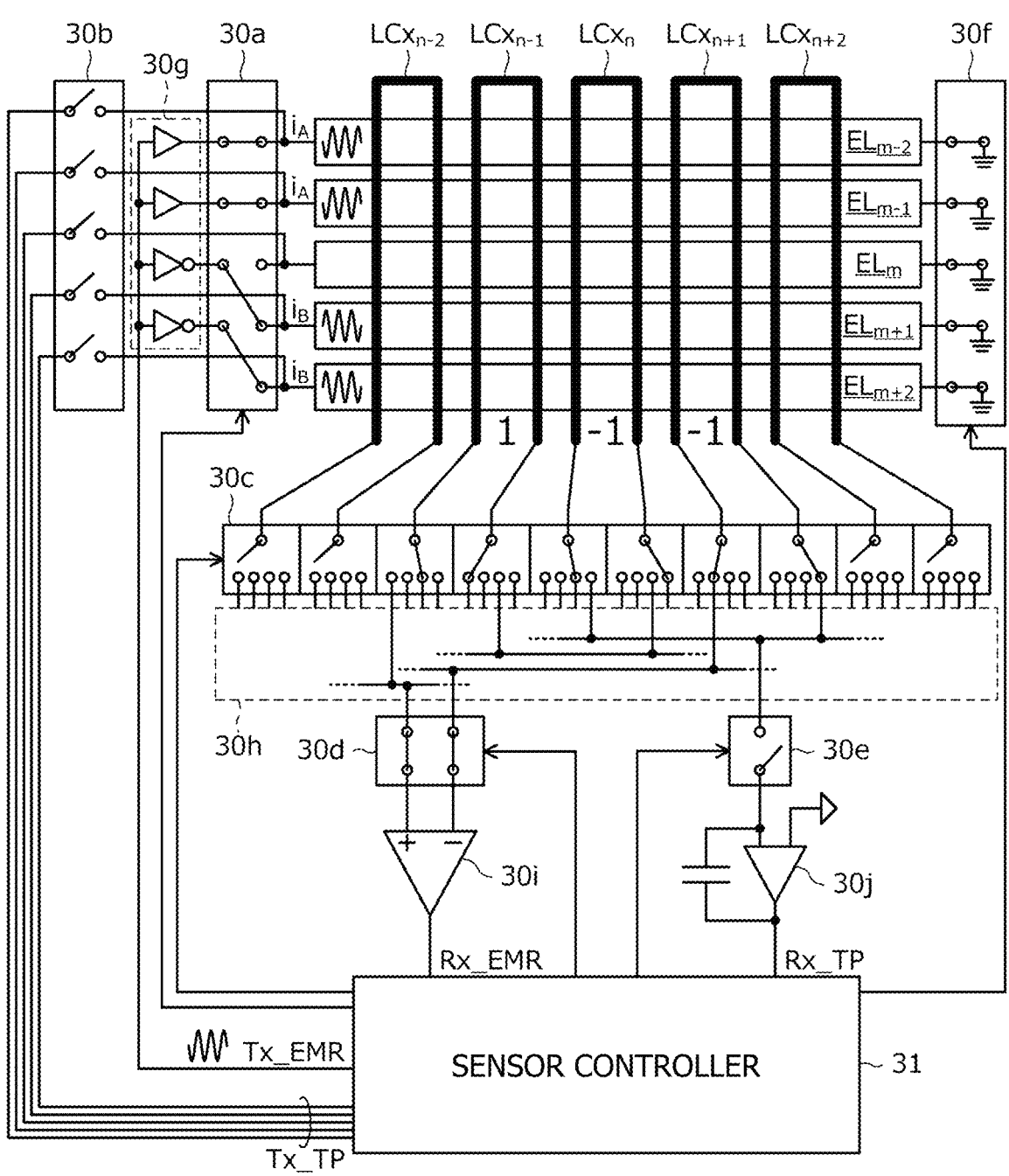
FIG. 5 is a diagram illustrating a state of the switch unit 30 when the sensor controller 31 detects the position of the electromagnetic resonance pen P.
Figure 6:
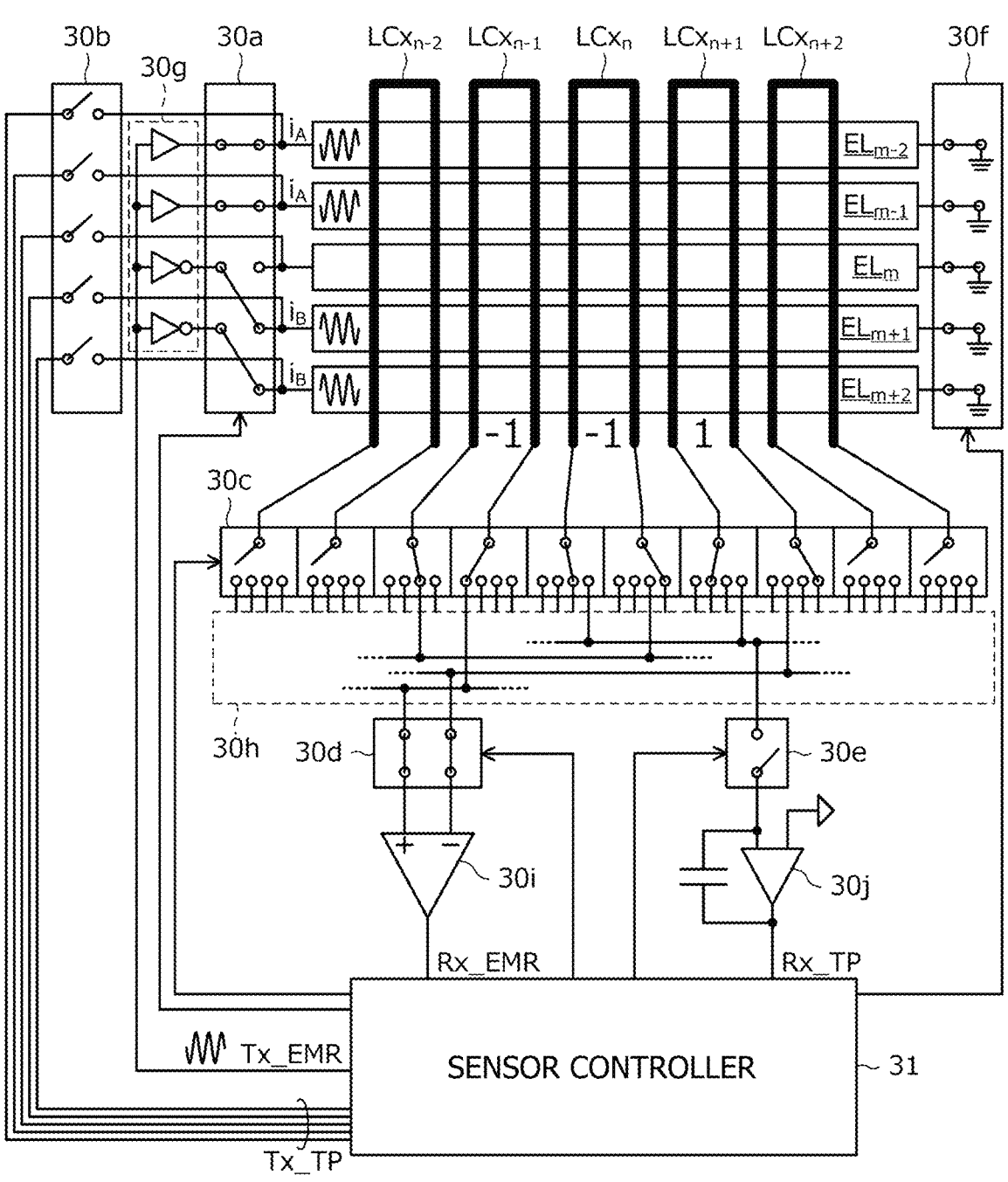
FIG. 6 is a diagram illustrating a state of the switch unit 30 when the sensor controller 31 detects the position of the electromagnetic resonance pen P.

Next, FIGS. 4 to 6 are diagrams illustrating a state of the switch unit 30 when the sensor controller 31 detects the position of the electromagnetic resonance pen P. As illustrated in FIGS. 4 to 6, the sensor controller 31 controls the switch 30$a$ to supply the alternating current $i_A$ to two linear electrodes $EL_{m-1}$ and $EL_{m-2}$ (first linear electrodes) adjacent to each other on one side and supply the alternating current is to two linear electrodes $EL_{m+1}$ and $EL_{m+2}$ (second linear electrodes) adjacent to each other on the other side across one linear electrode $EL_m$. In addition, the sensor controller 31 controls the switch 30$f$ to connect each input pin to the corresponding ground pin to put the other end of each linear electrode EL in the x direction into the grounded state.

As a result of the control, a pseudo coil is formed around the linear electrode $EL_m$, and an alternating magnetic field is generated on the touch surface (particularly, above the linear electrode $EL_m$). Hereinafter, the generation of the alternating magnetic field will be referred to as "export of the alternating magnetic field from the linear electrode $EL_m$." The sensor controller 31 is configured to sequentially set, as the linear electrode $EL_m$, the linear electrodes EL excluding four linear electrodes EL positioned at both ends of the entire linear electrodes EL and execute a similar process to thereby sequentially export similar alternating magnetic fields from the linear electrodes EL.

Note that it is preferable to arrange the four linear electrodes EL excluded from the execution of the process at positions outside the touch surface such that the position detection of the electromagnetic resonance pen P can be performed on the entire touch surface. In addition, although the alternating currents are applied to two linear electrodes EL on both sides of the linear electrodes $EL_m$ from which the alternating magnetic fields are exported in the present embodiment, it is only necessary to apply the alternating currents to one or more predetermined number of linear electrodes EL on each side. For example, the alternating currents may be applied to one linear electrode EL on both sides or may be applied to three or more linear electrodes EL on both sides.

As can also be understood from the description of FIGS. 4 to 6, the drive circuit 30$g$ is arranged on one end side of the linear electrodes EL in the longitudinal direction, and both the alternating currents $i_A$ and $i_B$ are supplied to one ends (end portions of the same side) of the linear electrodes EL in the x direction (longitudinal direction). Hereinafter, an advantageous effect obtained by adopting the configuration will be described in detail with reference also to a comparative example.

FIG. 7A is a diagram illustrating the method of supplying the alternating currents to the linear electrodes EL in the present embodiment, and FIG. 7B is a diagram illustrating a method of supplying the alternating current in a comparative example. First, as illustrated in FIG. 7A, the alternating current $i_A$ is supplied to the one ends of the linear electrodes $EL_{m-1}$ and $EL_{m-2}$ in the longitudinal direction, and the alternating current $i_B$ is supplied to the one ends of the linear electrodes $EL_{m+1}$ and $EL_{m+2}$ in the longitudinal direction in the present embodiment. On the other hand, in the comparative example, the alternating current $i_A$ is supplied to the one ends of the linear electrodes $EL_{m-1}$ and $EL_{m-2}$ in the longitudinal direction, and the alternating current $i_A$ is supplied to the other ends of the linear electrodes $EL_{m+1}$ and $EL_{m+2}$ in the longitudinal direction as illustrated in FIG. 7B. The method of supplying the alternating currents illustrated in the comparative example is described in, for example, Patent Literature 1.

FIG. 8A is a diagram illustrating a result of measuring the currents flowing through the linear electrodes EL in a probing area PA1 illustrated in FIG. 7A, and FIG. 8B is a diagram illustrating a result of measuring the currents flowing through the linear electrodes EL in a probing area PA2 illustrated in FIG. 7B. In FIGS. 8A and 8B, the horizontal axis indicates time, and the vertical axis indicates current value. Note that FIGS. 8A and 8B are drawn after inverting the current measured at the linear electrodes $EL_{m+1}$ and $EL_{m+2}$. In addition, FIGS. 8A and 8B illustrate a case in which the parasitic capacitance (hereinafter, referred to as "total parasitic capacitance") of the current paths of the linear electrodes EL is 1800 pF.

The alternating magnetic field can be most efficiently exported from the linear electrode $EL_m$ when the amplitude (amplitude A illustrated in FIG. 8B) of the current flowing through the linear electrodes $EL_{m-1}$ and $EL_{m-2}$ is equal to the amplitude (amplitude B illustrated in FIG. 8B) of the current flowing through the linear electrodes $EL_{m+1}$ and $EL_{m+2}$, and the phase difference (phase difference $\theta$ illustrated in FIG. 8B) between the current flowing through the linear electrodes $EL_{m-1}$ and $EL_{m-2}$ and the inverted signal of the current flowing through the linear electrodes $EL_{m+1}$ and $EL_{m+2}$ is 0°. In this regard, as can be understood from FIG. 8A, it can be stated that the ideal state is realized in terms of export efficiency of the alternating magnetic fields because A=B and $\theta$=0° hold in the present embodiment. On the other hand, as illustrated in FIG. 8B, A≠B and $\theta$≠0° (specifically, approximately 32°) hold in the comparative example. Therefore, it can be stated that the alternating magnetic fields from the linear electrodes $EL_m$ can be more efficiently exported in the present embodiment than in the comparative example.

Figure 9A:
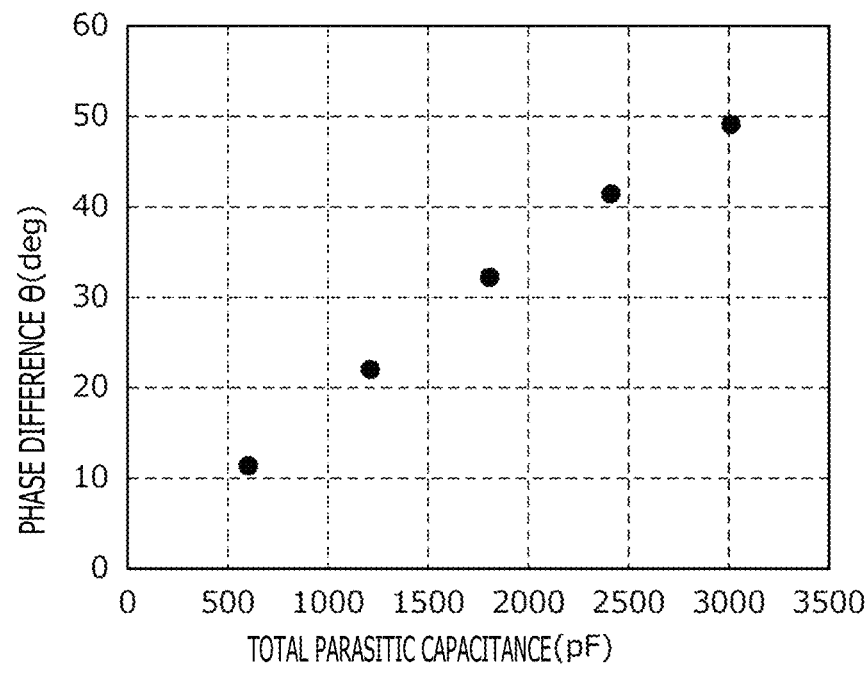
FIGS. 9A and 9B are diagrams in which results of measuring a phase difference $\theta$, an amplitude A, and an amplitude B in the comparative example are plotted for a case of a plurality different total parasitic capacitances.
Figure 9B:
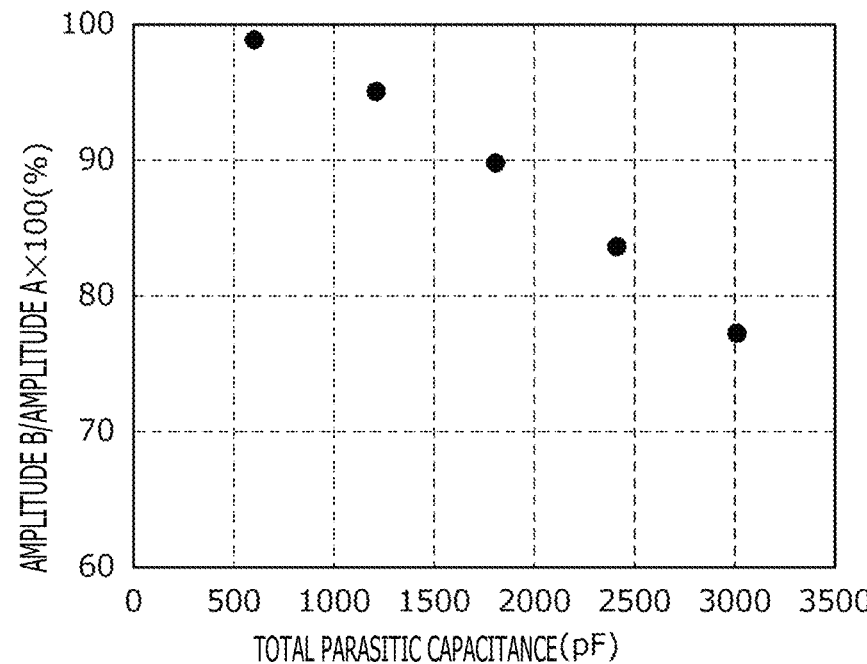

FIGS. 9A and 9B are diagrams in which results of measuring the phase difference $\theta$, the amplitude A, and the amplitude B in the comparative example are plotted for a case of a plurality different total parasitic capacitances. The horizontal axis of FIGS. 9A and 9B indicates the total parasitic capacitance. The vertical axis of FIG. 9A indicates the phase difference $\theta$, and the vertical axis of FIG. 9B indicates numerical values expressing amplitude B/amplitude A by percentage. As can be understood from FIGS. 9A and 9B, the larger the total parasitic capacitance, the more the comparative example is shifted from the ideal state. Therefore, it can be stated that the current paths need to be devised to reduce the total parasitic capacitance when the comparative example is adopted. On the other hand, the ideal state as in FIG. 8A can be obtained in the present embodiment regardless of the total parasitic capacitance, and there is no particular need to devise the current paths to reduce the total parasitic capacitance. Therefore, according to the present embodiment, an advantageous effect of facilitating the circuit design can also be obtained as compared to the comparative example.

Figure 10A:
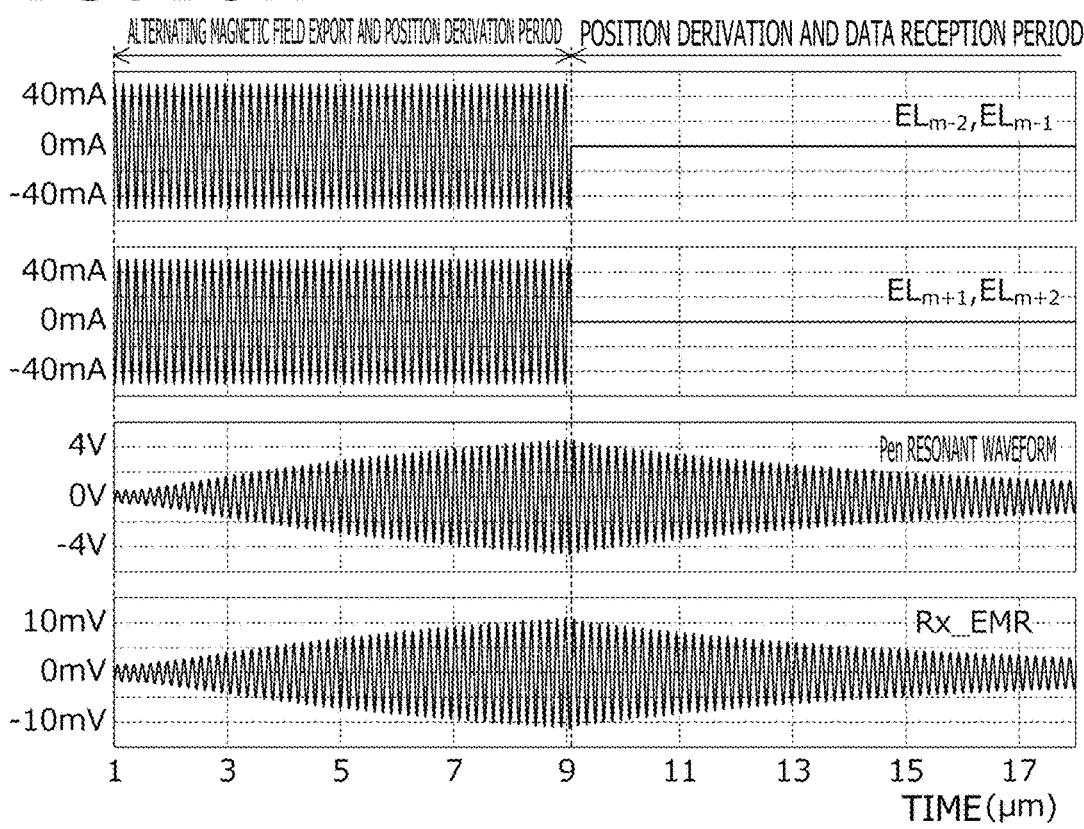
FIG. 10A is a diagram illustrating waveforms of various signals related to the present embodiment.
Figure 10B:
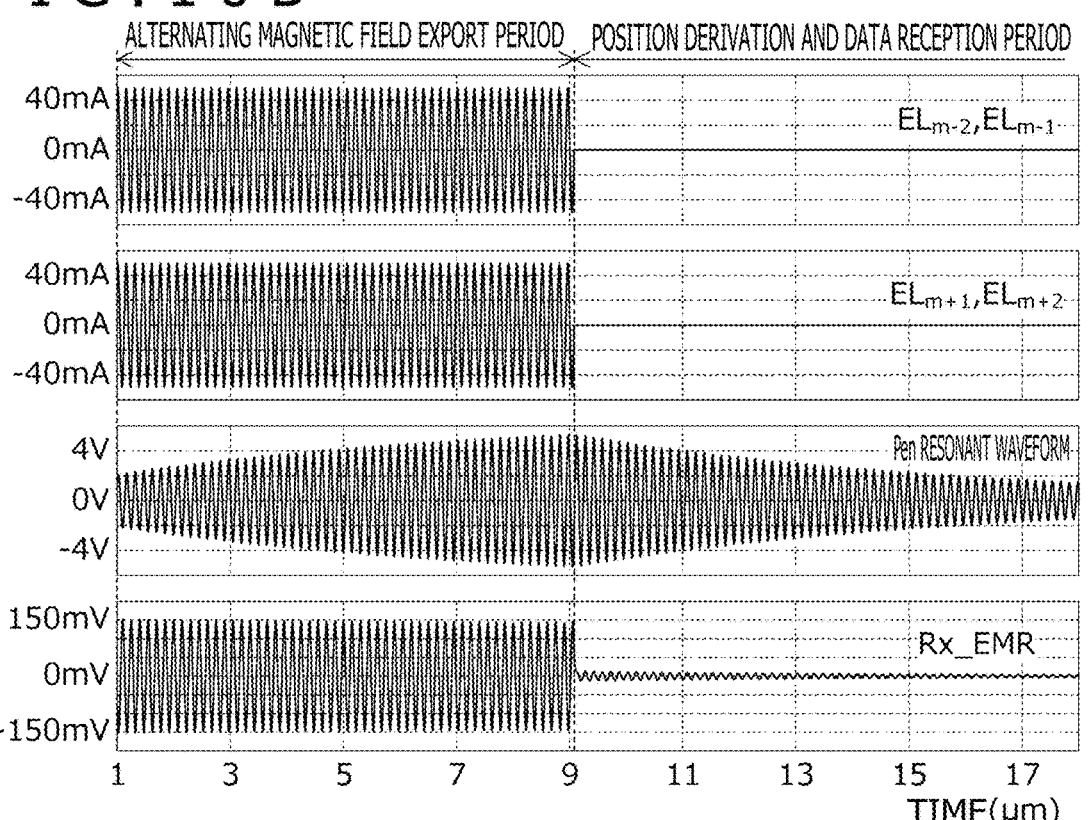
FIG. 10B is a diagram illustrating a method of supplying various signals related to the comparative example.

FIG. 10A is a diagram illustrating waveforms of various signals related to the present embodiment, and FIG. 10B is a diagram illustrating a method of supplying various signals related to the comparative example. FIGS. 10A and 10B illustrate a waveform of the current flowing through the linear electrodes $EL_{m-1}$ and $EL_{m-2}$, a waveform of the current flowing through the linear electrodes $EL_{m+1}$ and $EL_{m+2}$, a waveform (Pen resonant waveform) of the voltage (pen signal) generated inside the electromagnetic resonance pen P, and a waveform of the reception signal Rx_EMR detected by the loop coil LCx closest to the electromagnetic resonance pen P.

First, it can be understood from FIG. 10B that while the sensor controller 31 supplies the alternating current $i_A$ to the linear electrode EL (illustrated "alternating magnetic field export period"), the pen signal is generated inside the electromagnetic resonance pen P, and a waveform similar to the alternating current is generated in the linear electrode EL appears in the reception signal Rx_EMR. The waveform of the reception signal Rx_EMR is formed by superimposition of a voltage signal, which is induced in the loop coil LCx by the alternating magnetic field exported from the linear electrode EL, on a voltage signal, which is induced in the loop coil LCx by the pen signal exported from the electromagnetic resonance pen P. When the sensor controller 31 finishes supplying the alternating current $i_A$ to the linear electrode EL, the part corresponding to the voltage signal induced by the alternating magnetic field exported from the linear electrode EL disappears, and only the part corresponding to the voltage signal induced by the pen signal remains in the reception signal Rx_EMR. Although it is hard to see due to scaling, the waveform of the reception signal Rx_EMR after the end of the supply of the alternating current $i_A$ to the linear electrode EL is a waveform similar to the waveform of the pen signal. Therefore, the period after the "alternating magnetic field export period" is set as a "position derivation and data reception period" for deriving the position of the electromagnetic resonance pen P and receiving the data transmitted by the electromagnetic resonance pen P, and the sensor controller 31 according to the comparative example derives the position of the electromagnetic resonance pen P and receives the data transmitted by the electromagnetic resonance pen P based on the reception signal Rx_EMR acquired in the period.

On the other hand, the waveform of the reception signal Rx_EMR in FIG. 10A is a waveform similar to the pen signal throughout the entire period including the alternating magnetic field export period. This is because as illustrated in FIG. 8A, there is no phase shift between the current flowing through the linear electrodes $EL_{m-1}$ and $EL_{m-2}$ and the current flowing through the linear electrodes $EL_{m+1}$ and $EL_{m+2}$. The currents cancel each other, and the voltage signal induced in the loop coil LCx by the alternating magnetic field exported from the linear electrode $EL_m$ is not superimposed on the reception signal Rx_EMR. That is, it can be stated that the present embodiment realizes the reduction in noise superimposed on the alternating magnetic field detected by the loop coil LCx. The sensor controller 31 according to the present embodiment utilizes this advantageous effect to use the "alternating magnetic field export period" also as a "position derivation period" for deriving the position of the electromagnetic resonance pen P and derives the position of the electromagnetic resonance pen P based on the voltage signal appearing at the loop coil LCx in the period. Therefore, according to the present embodiment, a longer period of receiving the pen signal for deriving the position of the electromagnetic resonance pen P can be reserved as compared to the comparative example, and the position of the electromagnetic resonance pen P can be derived with a higher accuracy than in the comparative example.

Note that the reason the sensor controller 31 according to the present embodiment does not receive the data transmitted by the electromagnetic resonance pen P in the "alternating magnetic field export period" is that the electromagnetic resonance pen P cannot transmit data in the "alternating magnetic field export period." More specifically, the electromagnetic resonance pen P is configured to change the resonant frequency of the resonant circuit in the electromagnetic resonance pen P according to the content of the data to be transmitted and modulate the frequency of the pen signal based on the resonant frequency to thereby transmit the data. When there is an alternating magnetic field from the position detection apparatus 3, the frequency of the pen signal is fixed to the frequency of the alternating magnetic field. Even if the resonant frequency of the resonant circuit is changed in the electromagnetic resonance pen P, the change is not reflected on the frequency of the pen signal. Therefore, the electromagnetic resonance pen P cannot transmit the data in the "alternating magnetic field export period."

FIGS. 4 to 6 will be further described. While the sensor controller 31 exports the alternating magnetic field from the linear electrode $EL_m$, the sensor controller 31 executes a process of maintaining the switch 30d in the connection state, sequentially selecting sets of loop coils LCx, each set including three adjacent loop coils LCx, and each time the set is selected, controlling the switch 30c to connect the three loop coils LCx included in the selected set in series to the differential amplifier 30i in three connection modes with different connection polarities. As a result of the process, the differential amplifier 30i detects a result value indicating the level of the pen signal based on the potential between both ends of a composite coil including the three loop coils LCx connected in series and outputs the result value as a reception signal Rx_EMR to the sensor controller 31.

FIGS. 4 to 6 illustrate connections in the three connection modes. Specifically, in the example of FIG. 4, the loop coil $LCX_{n-1}$ is connected counterclockwise (written as "−1" in FIG. 4) as viewed from the non-inverting input terminal of the differential amplifier 30i. Next, the loop coil $LCx_n$ is connected clockwise (written as "1" in FIG. 4). Lastly, the loop coil $LCx_{n+1}$ is connected counterclockwise. Furthermore, in the example of FIG. 5, the loop coil $LCx_{n-1}$ is connected clockwise as viewed from the non-inverting input terminal of the differential amplifier 30i. Next, the loop coil $LCX_n$ is connected counterclockwise. Lastly, the loop coil $LCx_{n+1}$ is connected counterclockwise. In the example of FIG. 6, the loop coil $LCx_{n-1}$ is connected counterclockwise as viewed from the non-inverting input terminal of the differential amplifier 30i. Next, the loop coil $LCX_n$ is connected counterclockwise. Lastly, the loop coil $LCx_{n+1}$ is connected clockwise.

Figure 11:
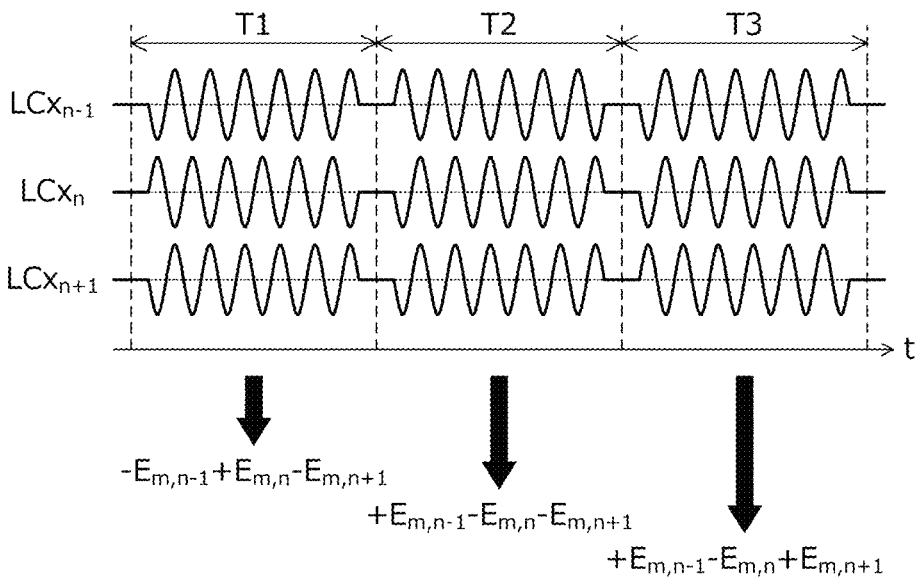
FIG. 11 is a diagram describing a reception signal Rx supplied from a differential amplifier 30i to the sensor controller 31.

FIG. 11 is a diagram describing the reception signal Rx_EMR supplied from the differential amplifier 30i to the sensor controller 31 as a result of the connections. Illustrated pen signal detection periods T1 to T3 correspond to the connection states of FIGS. 4 to 6, respectively. Although the alternating magnetic field export period (see FIG. 10) is actually arranged in the first half of each pen signal detection period, this is not illustrated in FIG. 11. In addition, although the actual reception signal Rx_EMR is attenuated with time as illustrated in FIG. 10, the attenuation is not depicted in FIG. 11 to facilitate the understanding. These are similar in FIGS. 12 and 13 described later.

It can be understood from FIG. 11 that the phase of the pen signal received by the loop coil $LCX_n$ and the phase of the pen signal received by the loop coils $LCx_{n-1}$ and $LCx_{n+1}$ in the pen signal detection period T1 are opposite. This is because the loop coil $LCx_n$ is clockwise, and the loop coils $LCx_{n-1}$ and $LCx_{n+1}$ are counterclockwise as described above. As a result, assuming that the levels of the pen signal received by the loop coils $LCx_{n-1}$ to $LCx_{n+1}$ when the sensor controller 31 generates the alternating magnetic field in the linear electrode $EL_m$ are written as levels $E_{m,n-1}$ to $E_{m,n+1}$, respectively, the reception signal Rx_EMR (result value) supplied from the differential amplifier 30i to the sensor controller 31 in the pen signal detection period T1 is represented by $-E_{m,n-1}+E_{m,n}-E_{m,n+1}$ as illustrated in FIG. 11. This is also similar in the pen signal detection periods T2 and T3, and the reception signal Rx_EMR is represented by $+E_{m,n-1}-E_{m,n}-E_{m,n+1}$ and $-E_{m,n-1}-E_{m,n}+E_{m,n+1}$, respectively.

A vector $d_{series}$ illustrated in the following Equation (7) is description in a vector format of the reception signals Rx_EMR received in the pen signal detection periods T1 to T3. As illustrated in the last line of Equation (7), the vector $d_{series}$ can be transformed into a form of the product of a 3×3 matrix F indicating the connection polarity in each pen signal detection period and a vector representing the levels $E_{m,n-1}$ to $E_{m,n+1}$. Note that the matrix F illustrated in Equation (7) includes a 3×3 Walsh code.

Math. 7

$$
d_{series} = \begin{pmatrix} -E_{m,n-1} + E_{m,n} - E_{m,n+1} \\ +E_{m,n-1} - E_{m,n} - E_{m,n+1} \\ -E_{m,n-1} - E_{m,n} + E_{m,n+1} \end{pmatrix} \quad (7)
$$
$$
= \begin{pmatrix} -1 & 1 & -1 \\ 1 & -1 & -1 \\ -1 & -1 & 1 \end{pmatrix}\begin{pmatrix} E_{m,n-1} \\ E_{m,n} \\ E_{m,n+1} \end{pmatrix} = F\begin{pmatrix} E_{m,n-1} \\ E_{m,n} \\ E_{m,n+1} \end{pmatrix}
$$

The sensor controller 31 performs calculation on the vector $d_{series}$ as illustrated on the left side of the following Equation (8) to thereby separate and acquire the levels $E_{m,n-1}$ to $E_{m,n+1}$. Here, a matrix $F^{-1}$ illustrated in Equation (8) is an inverse matrix of the matrix F, and therefore, the calculation illustrated on the left side of Equation (8) is recovery calculation corresponding to the connection polarity of the loop coil LCx in each connection mode. As also illustrated in Equation (8), an identity matrix I is obtained by multiplying the matrix F by the matrix $F^{-1}$. Therefore, the sensor controller 31 can perform the recovery calculation to separate and acquire the levels $E_{m,n-1}$ to $E_{m,n+1}$ of the pen signal received by the loop coils $LCx_{n-1}$ to $LCx_{n+1}$, respectively, when the alternating magnetic field is exported from the mth linear electrode $EL_m$ as illustrated on the right side of Equation (8).

Math. 8

$$
F^{-1}d_{series} = F^{-1}F\begin{pmatrix} E_{m,n-1} \\ E_{m,n} \\ E_{m,n+1} \end{pmatrix} = I\begin{pmatrix} E_{m,n-1} \\ E_{m,n} \\ E_{m,n+1} \end{pmatrix} = \begin{pmatrix} E_{m,n-1} \\ E_{m,n} \\ E_{m,n+1} \end{pmatrix} \quad (8)
$$

The sensor controller 31 executes calculation similar to Equation (8) on each set of the loop coils LCx to separate and acquire the levels of the pen signal received by the plurality of loop coils LCx when the alternating magnetic field is exported from the mth linear electrode $EL_m$. The sensor controller 31 also executes similar processes while changing the linear electrode $EL_m$ that exports the alternating magnetic field to thereby acquire the levels of the pen signal received by the plurality of loop coils LCx when the alternating magnetic field is exported from each of the plurality of linear electrodes $EL_m$. The sensor controller 31 then derives the position (two-dimensional position) of the electromagnetic resonance pen P based on the distribution of the acquired levels of the pen signal in the touch surface. Specifically, the sensor controller 31 can derive the position corresponding to the apex of the distribution as the position of the electromagnetic resonance pen P. The details of the position detection of the electromagnetic resonance pen P executed by the sensor controller 31 will be more specifically described later with reference to FIGS. 15 to 17.

Here, comparative examples in which methods different from the present embodiment are used to receive the pen signal will be illustrated to describe one advantageous effect of using the present embodiment.

Figure 12:
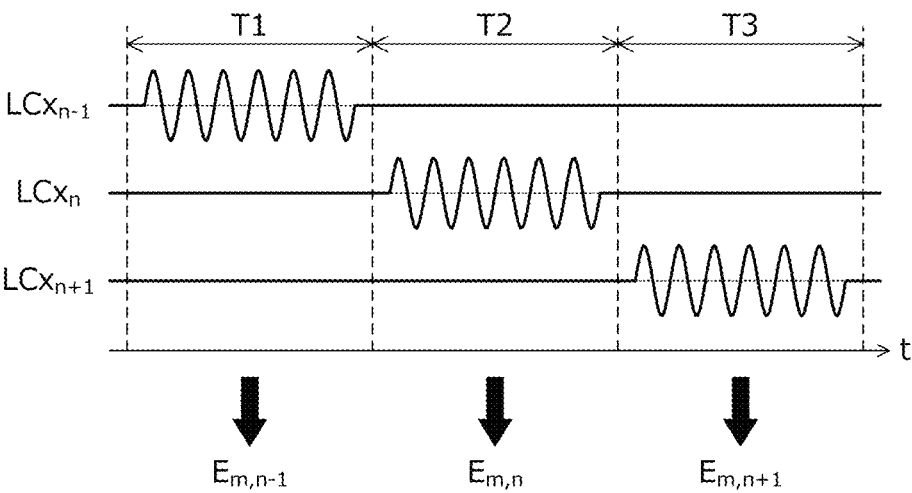
FIG. 12 is a diagram describing the reception signal Rx according to a first comparative example.

FIG. 12 is a diagram describing the reception signal Rx_EMR according to a first comparative example. The sensor controller 31 according to the present comparative example connects one loop coil LCx to the differential amplifier 30i in each pen signal detection period. In this case, the level of the pen signal received by one loop coil LCx can be obtained in the pen signal detection period, and the sensor controller 31 can acquire the level of the pen signal received by each loop coil LCx without performing the calculation.

Figure 13:
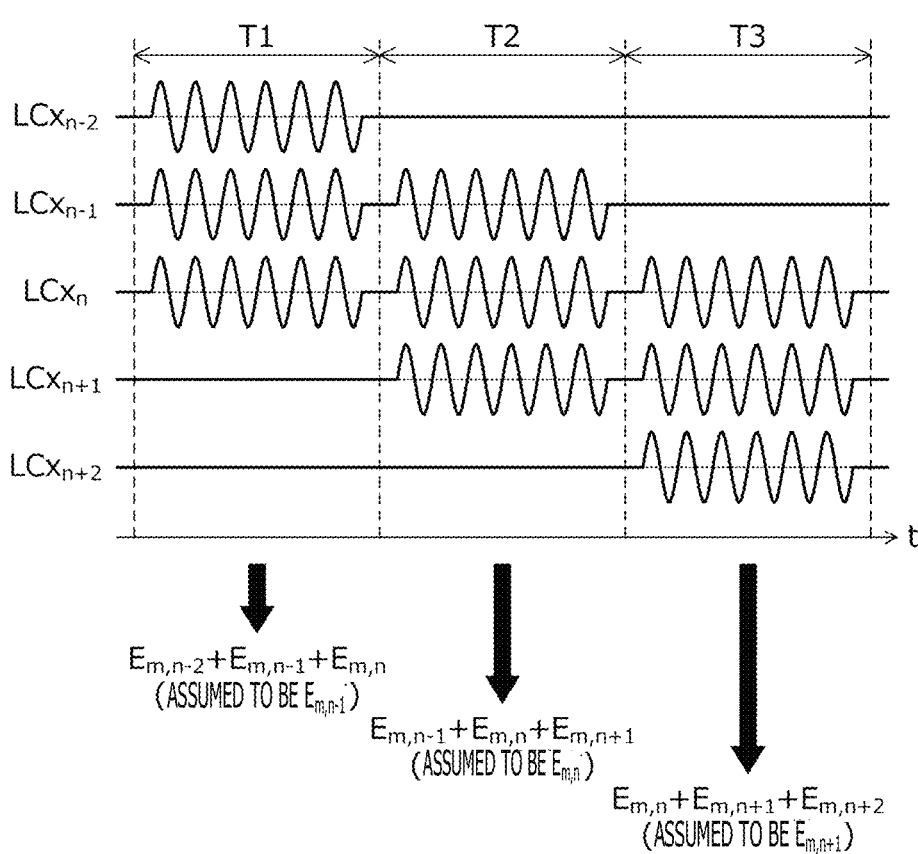
FIG. 13 is a diagram describing the reception signal Rx according to a second comparative example.

FIG. 13 is a diagram describing the reception signal Rx_EMR according to a second comparative example. The sensor controller 31 according to the present comparative example connects three adjacent loop coils LCx to the differential amplifier 30i in series in each pen signal detection period as in the present embodiment. However, the sensor controller 31 according to the present comparative example connects all of the loop coils LCx in the same direction (clockwise or counterclockwise). In this case, although the levels of the pen signal received by the loop coils LCx cannot be separated by the calculation, the sensor controller 31 can assume that the reception signal Rx obtained through the three loop coils LCx is obtained by the loop coil LCx positioned at the center among the three loop coils LCx to derive the position of the electromagnetic resonance pen P.

FIG. 14 is a diagram illustrating results of simulating the levels of the pen signal (levels after separation when the levels are separated and acquired) received by the loop coils LCx near the loop coil $LCx_n$ when the electromagnetic resonance pen P is positioned on the loop coil $LCx_n$. FIG. 14 illustrates results of the present embodiment (FIG. 11), the first comparative example (FIG. 12), and the second comparative example (FIG. 13). As illustrated in FIG. 14, the reception method of the pen signal according to the present embodiment can obtain an advantageous effect that the reception level of the pen signal is significantly higher than in the first and second comparative examples. This is because according to the reception method of the pen signal of the present embodiment, the pen signal detection period that can be used to obtain the pen signal received by the individual loop coils LCx is three times the pen signal detection period in the first and second comparative examples. Here, as described later, when the pen signal detection period of the pen signal in the sensor controller 31 is increased by N times, the level of the received pen signal is increased by N times, but the level of the received noise is increased by just $N^{1/2}$ times. Therefore, it can be stated that the reception method of the pen signal according to the present embodiment can improve the S/N ratio of the pen signal received by the sensor controller 31.

In addition, according to the reception method of the pen signal in the present embodiment, one reception circuit can receive at the same time the pen signals received by a plurality of loop coils LCx in each of the plurality of pen signal detection periods, and the reception signal Rx_EMR can be separated into components of individual loop coils LCx. Therefore, the transmission period of the pen signal does not have to be increased to improve the S/N ratio, and a reception circuit does not have to be added for a plurality of loop coils LCx to receive the pen signal in parallel. Therefore, it can be stated that the reception method of the pen signal according to the present embodiment can improve the S/N ratio of the pen signal received by the sensor controller 31 without reducing the frequency of the position detection and without increasing the circuit scale of the sensor controller 31.

Hereinafter, the fact that the level of noise is increased by just $N^{1/2}$ times when the pen signal detection period of the pen signal in the sensor controller 31 is increased by N times will be described in detail.

The reception signal Rx acquired in a k-th pen signal detection period will be represented by Xx, and the variance of Xx will be represented by $V(X_k)$. Due to the additivity of variance, a variance $V_{TOTAL}$ of a signal (hereinafter, simply referred to as "addition signal") obtained by adding N reception signals $X_1$ to $X_N$ acquired in first to Nth pen signal detection periods is represented by the total variance of the reception signals Rx in the individual pen signal detection periods as illustrated in the following Equation (9).

Math. 9

$$V_{TOTAL} = V(X_1) + V(X_2) + V(X_3) + \ldots + V(X_N) \qquad (9)$$

When only the noise components included in the reception signal Rx are looked, it can be considered that the values of the noise are the same in all of the pen signal detection periods, and the variance $V_{TOTAL}$ of the addition signal is further represented by the following Equation (10). Here, V and σ represent the variance and the standard deviation in the individual pen signal detection periods, respectively.

Math. 10

$$V_{TOTAL} = V + V + V + \ldots + V = N \cdot V = N \cdot \sigma^2 \qquad (10)$$

The amount of noise appearing in the addition signal is represented by a standard deviation $\sigma_{TOTAL}$ of the addition signal. Based on Equation (10), the standard deviation $\sigma_{TOTAL}$ is represented by the following Equation (11). Therefore, it can be understood that the level of noise is increased by just $N^{1/2}$ times when the pen signal detection period of the pen signal in the sensor controller 31 is increased by N times.

Math. 11

$$\sigma_{TOTAL} = \sqrt{V_{TOTAL}} = \sqrt{N}\,\sigma \qquad (11)$$

Next, the position detection of the electromagnetic resonance pen P executed by the sensor controller 31 will be described in more detail with reference to flow diagrams.

Figure 15:
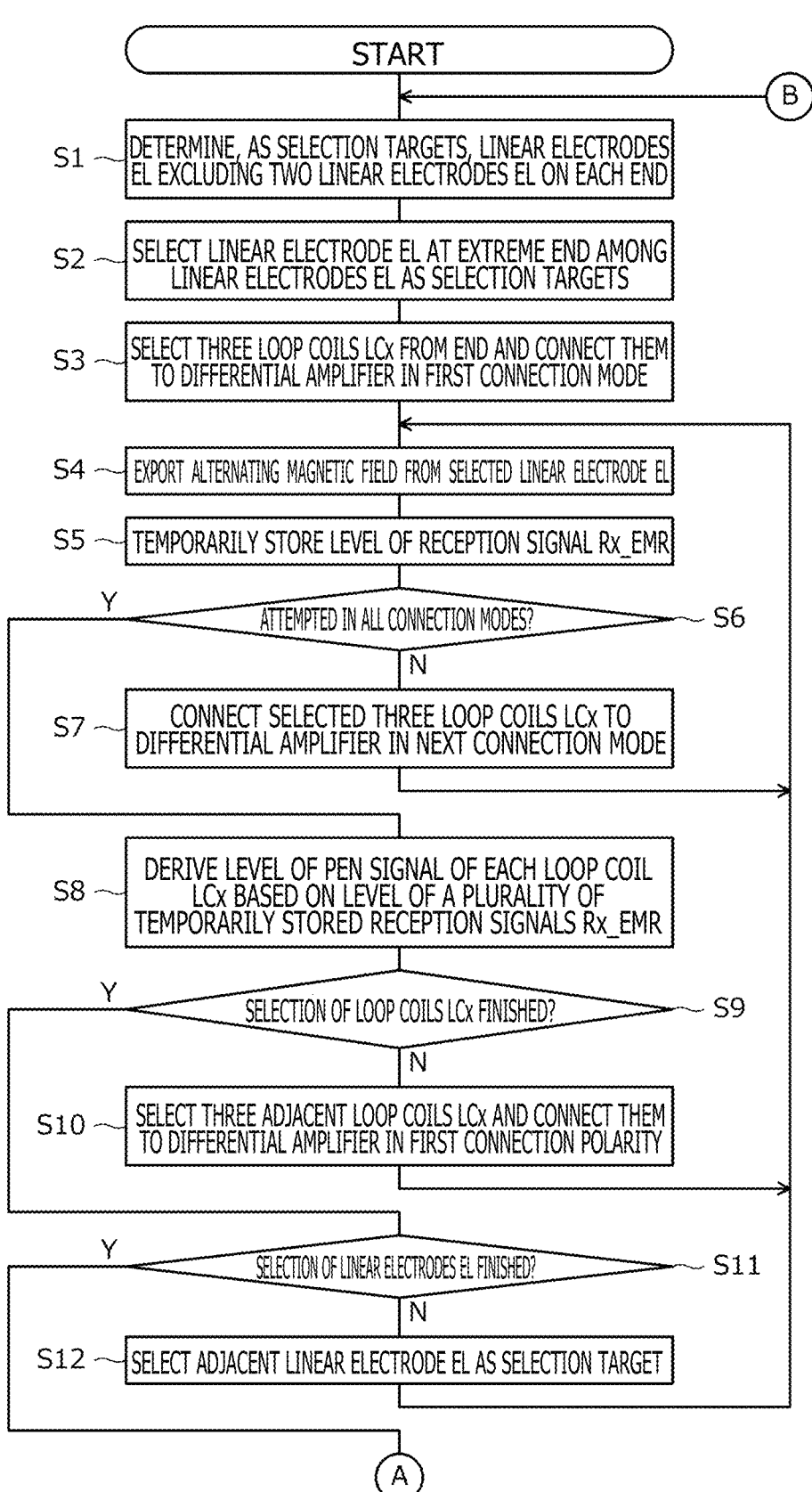
FIG. 15 is a flow diagram illustrating an entire flow of the position detection of the electromagnetic resonance pen P executed by the sensor controller 31.
Figure 16:
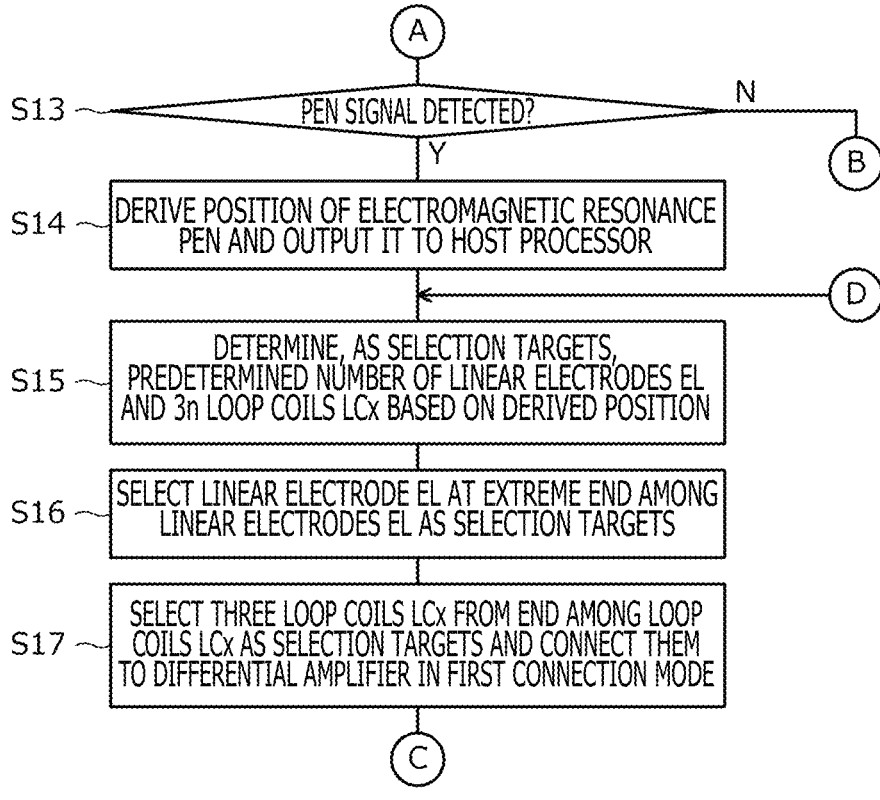
FIG. 16 is a flow diagram illustrating the entire flow of the position detection of the electromagnetic resonance pen P executed by the sensor controller 31.

FIGS. 15 to 17 are flow diagrams illustrating the entire flow of the position detection of the electromagnetic resonance pen P executed by the sensor controller 31. First, in FIG. 15, the sensor controller 31 before detecting the electromagnetic resonance pen P determines, as selection targets, the linear electrodes EL excluding the two linear electrodes EL on each end (S1) and selects the linear electrode EL at the extreme end among the linear electrodes EL as the selection targets (S2). In addition, the sensor controller 31 selects three loop coils LCx from the end and controls the switches 30c to 30e to connect the selected three loop coils LCx to the differential amplifier 30i in a first connection mode (for example, connection mode illustrated in FIG. 4) (S3).

Next, the sensor controller 31 starts to export the alternating magnetic field from the selected linear electrode EL (S4). Specifically, as illustrated in FIG. 4, the sensor controller 31 controls the switch 30a to connect the two adjacent linear electrodes EL on one side across the selected linear electrode EL to the output terminals of the alternating current is in the drive circuit 30g (output terminals of buffer circuit) and connect the two adjacent linear electrodes EL on the other side across the selected linear electrode EL to the output terminals of the alternating current $i_B$ in the drive circuit 30g (output terminals of inverting buffer circuit) to start supplying the alternating current Tx_EMR to the drive circuit 30g. The sensor controller 31 then temporarily stores the level of the reception signal Rx_EMR output from the differential amplifier 30i according to the alternating magnetic field exported at S4 (S5). The level of the reception signal Rx_EMR stored here may be, for example, the maximum value in the entire position derivation period illustrated in FIG. 10A (including the position derivation period that is the alternating magnetic field export period and the position derivation period after the alternating magnetic field export period) or may be the maximum value in the position derivation period after the alternating magnetic field export period.

Next, the sensor controller 31 determines whether or not the process of S4 and S5 has been attempted in all of the connection modes (S6). Specifically, the sensor controller 31 determines whether or not the process of S4 and S5 has been attempted in all of the three connection modes illustrated in FIGS. 4 to 6. The sensor controller 31 that has determined that the process has not been attempted in all of the connection modes in the determination controls the switches 30c to 30c to connect the selected three loop coils LCx to the differential amplifier 30i in the next connection mode (for example, the connection mode illustrated in FIG. 5 after the connection mode illustrated in FIG. 4 or the connection mode illustrated in FIG. 6 after the connection mode illustrated in FIG. 5) (S7) and returns to S4.

On the other hand, the sensor controller 31 that has determined that the process has been attempted in all of the connection modes at S6 derives the level of the pen signal of each loop coil LCx based on the levels of the plurality of the reception signals Rx_EMR temporarily stored in the plurality of attempts of S5 (S8). Specifically, the sensor controller 31 performs the recovery calculation illustrated in Equation (8).

Next, the sensor controller 31 determines whether or not the selection of all of the loop coils LCx is finished (S9). If the sensor controller 31 determines that the selection is not finished, the sensor controller 31 selects three loop coils LCx adjacent to the three loop coils LCx selected last time (three loop coils selected at S3 or S10) and controls the switches 30c to 30e to connect the three loop coils LCx to the differential amplifier 30i in the first connection mode (for example, connection mode illustrated in FIG. 4) (S10). The sensor controller 31 then returns to S4. On the other hand, if the sensor controller 31 determines that the selection is finished at S9, the sensor controller 31 determines whether or not the selection of all of the linear electrodes EL determined to be the selection targets at S1 is finished (S11). If the sensor controller 31 determines that the selection is not finished, the sensor controller 31 selects the linear electrode EL adjacent to the linear electrode EL selected last time (linear electrode EL selected at S2 or S12) (S12) and returns to S4.

The sensor controller 31 that has determined that the selection is finished at S11 determines whether or not the pen signal is detected based on the level of the pen signal in each combination of the linear electrode EL and the loop coil LCx obtained by repeating S8 (S13 of FIG. 16). In one example, the result of the determination is affirmative when there is a level exceeding a predetermined value, and the result of the determination is negative in other cases.

The sensor controller 31 that has determined that the pen signal is not detected at S13 returns to S1 of FIG. 15 and continues the process. On the other hand, the sensor controller 31 that has determined that the pen signal is detected derives the position of the electromagnetic resonance pen P based on the level of the pen signal in each combination of the linear electrode EL and the loop coil LCx derived at S8 of FIG. 15 and outputs the position to the host processor 32 (S14).

Next, the sensor controller 31 determines (updates), as selection targets, a predetermined number of (a number smaller than the number of linear electrodes EL determined to be the selection targets at S1 of FIG. 15, which is typically three or four) linear electrodes EL (linear electrode set) and 3n (n is a natural number which is typically n=1, where 3n is a number smaller than the total number of loop coils LCx) loop coils LCx based on the position derived at S14 (position derived at S28 of the last time in the case of transition from S28 described later) (S15).

Next, the sensor controller 31 selects the linear electrode EL at the extreme end among the linear electrode EL as the selection targets (S16). The sensor controller 31 then selects three loop coils LCx from the end among the loop coils LCx as the selection targets and controls the switches 30c to 30e to connect the selected three loop coils LCx to the differential amplifier 30i in the first connection mode (for example, connection mode illustrated in FIG. 4) (S17).

In FIG. 17, the sensor controller 31 executes a process similar to S4 to S13 of FIGS. 15 and 16 (S18 to S27). However, the process here is different from the process of S4 to S14 in that while only the level of the reception signal Rx_EMR is temporarily stored at S5, a series of digital values (obtained by sampling) included in the reception signal Rx_EMR are also stored at S19. The processes are different in that while whether or not the selection of all of the loop coils LCx is finished is determined at S9, whether or not the selection of all of the loop coils LCx determined to be the selection targets in S15 is finished is determined at S23. The processes are different in that while whether or not the selection of all of the linear electrodes EL determined to be the selection targets at S1 is finished is determined at S11, whether or not the selection of all of the linear electrodes EL determined to be the selection targets at S15 is finished is determined at S25. Note that the series of digital values stored at S19 may be only the values in the position derivation and data reception period illustrated in FIG. 10A.

The sensor controller 31 that has determined that the pen signal is detected at S27 derives the position of the electromagnetic resonance pen P, acquires the data transmitted by the electromagnetic resonance pen P, and outputs the data to the host processor 32 (S28). Specifically, the sensor controller 31 derives the position of the electromagnetic resonance pen P based on the level of the pen signal in each combination of the linear electrode EL and the loop coil LCx derived at S22. In addition, the sensor controller 31 demodulates the series of digital values stored at S19 in relation to the combination of the linear electrode EL and the loop coil LCx closest to the derived position to thereby acquire the data transmitted by the electromagnetic resonance pen P. After the end of the S28, the sensor controller 31 returns to step S15 and continues the process.

When the process is adopted, the sensor controller 31 according to the present embodiment can specify the linear electrode set once at S15 of FIG. 16 and then export the alternating magnetic fields from only a predetermined number of linear electrodes EL included in the linear electrode set to thereby update the two-dimensional position of the electromagnetic resonance pen P. This can prevent the increase in power consumption even when the linear electrodes EL substitute the Tx coils.

As described above, the position detection system 1 according to the present embodiment can specify the linear electrode set once and then export the alternating magnetic fields only from a predetermined number of linear electrodes EL included in the linear electrode set to thereby update the two-dimensional position of the electromagnetic resonance pen P. This can prevent the increase in power consumption even when the linear electrodes EL substitute the Tx coils.

In addition, the position detection system 1 according to the present embodiment can prevent occurrence of phase shift between the current flowing through the linear electrodes $EL_{m-1}$ and $EL_{m-2}$ and the current flowing through the linear electrodes $EL_{m+1}$ and $EL_{m+2}$. This can reduce the noise superimposed on the alternating magnetic fields detected by the Rx coils (loop coils LCx) when the linear electrodes EL substitute the Tx coils.

In addition, the position detection system 1 according to the present embodiment can improve the S/N ratio of the pen signal received by the sensor controller 31 without reducing the frequency of the position detection and without increasing the circuit scale of the sensor controller 31.

In addition, according to the position detection system 1 of the present embodiment, one set of linear electrodes EL lined up and arranged in the y direction and one set of loop coils LCx lined up and arranged in the x direction can realize both the EMR sensor and the touch sensor (sensor that uses the capacitance system to detect a touch by the finger F). This can realize the weight reduction and the cost reduction of the position detection apparatus as compared to the case of separately providing the EMR sensor and the touch sensor in one position detection apparatus.

In addition, according to the position detection system 1 of the present embodiment, the differential amplifier 30i is used to receive the reception signal Rx_EMR. Therefore, even if resistance values vary among the loop coils LCx, the variations in the levels of the pen signal can be suppressed. This is particularly effective when the loop coils LCx contain a high-impedance material, such as a metal mesh.

Incidentally, although the matrix F illustrated in Equation (7) is a matrix represented by a 3×3 Walsh code in the example described in the present embodiment, a matrix represented by a code other than the Walsh code, such as an OVSF code, an M-sequence code, and a Baker code, can be suitably used as the matrix F (that is, the connection mode of the loop coils LCx in each pen signal detection period can be set such that the matrix F is one of these codes).

This will be generalized and described. When k loop coils LCx are connected in series to the differential amplifier 30i at the same time (that is, when the sensor controller 31 controls the switch 30c, so that sets of k adjacent loop coil LCx are sequentially selected while the alternating magnetic field is exported from one of the linear electrodes EL, and every time the set is selected, the k loop coils LCx included in the selected set are connected in series to the differential amplifier 30i in k connection modes with different connection polarities), if the rank of the matrix F (matrix of k rows and k columns) as a coefficient matrix of simultaneous equations represented by the following Equation (12) is equal to k, the connection mode of the loop coils LCx in each pen signal detection period can be determined based on the matrix F. In other words, when column vectors of the matrix F are linearly independent of each other, the connection mode of the loop coils LCx in each pen signal detection period can be determined based on the matrix F. This is because Equation (12) always has a solution in any case.

Math. 12

$$F\begin{pmatrix} E_{m,n} \\ E_{m,n+1} \\ E_{m,n+2} \\ \vdots \\ E_{m,n+k} \end{pmatrix} = d_{series} \tag{12}$$

In addition, although the inverse matrix $F^{-1}$ of the matrix F is used to perform the recovery calculation in the example described in the present embodiment, a matrix that is not the inverse matrix can also be used to perform the recovery calculation. Hereinafter, an example of the case in which the vector $d_{series}$ illustrated in Equation (7) is obtained will be illustrated to describe an example of the recovery calculation in which the matrix F is used as the matrix that is not the inverse matrix of the matrix F.

In the example, the matrix F for recovery and the levels $-E_{m,n-1}+E_{m,n}-E_{m,n+1}$, $+E_{m,n-1}-E_{m,n}-E_{m,n+1}$, and $-E_{m,n-1}-E_{m,n}+E_{m,n+1}$ of the reception signal Rx in the pen signal detection periods T1 to T3 are first used to derive the level of the reception signal Rx corresponding to the case in which all columns of the matrix F are 1. Specifically, simultaneous equations illustrated in the following Equation (13) can be solved to obtain a, b, and c, and a+b+c can be derived to derive the level of the reception signal Rx corresponding to the case in which all columns of the matrix F are 1. The level derived in this way is $+E_{m,n-1}+E_{m,n}+E_{m,n+1}$.

Math. 13

$$\begin{pmatrix} -1 & 1 & -1 \\ 1 & -1 & -1 \\ -1 & -1 & 1 \end{pmatrix}\begin{pmatrix} a \\ b \\ c \end{pmatrix} = \begin{pmatrix} -E_{m,n-1} + E_{m,n} - E_{m,n+1} \\ +E_{m,n-1} - E_{m,n} - E_{m,n+1} \\ -E_{m,n-1} - E_{m,n} + E_{m,n+1} \end{pmatrix} \tag{13}$$

Next, as illustrated in the following Equation (14), a column in which the values of all elements are 1 is added to the top of the matrix F, and a row with a value of $+E_{m,n-1}+E_{m,n}+E_{m,n+1}$ is added to the top of the vector $d_{series}$. The matrix F is multiplied by the vector $d_{series}$. In this way, a result obtained by linearly amplifying (specifically, increased by four times) the calculation result of Equation (8) can be acquired.

Math. 14

$$\begin{pmatrix} 1 & -1 & 1 & -1 \\ 1 & 1 & -1 & -1 \\ 1 & -1 & -1 & 1 \end{pmatrix}\begin{pmatrix} +E_{m,n-1} + E_{m,n} + E_{m,n+1} \\ -E_{m,n-1} + E_{m,n} - E_{m,n+1} \\ +E_{m,n-1} - E_{m,n} - E_{m,n+1} \\ -E_{m,n-1} - E_{m,n} + E_{m,n+1} \end{pmatrix} = 4\begin{pmatrix} E_{m,n-1} \\ E_{m,n} \\ E_{m,n+1} \end{pmatrix} \tag{14}$$

In this way, when a matrix that is not the inverse matrix $F^{-1}$ of the matrix F is used to perform the recovery calculation, the level of the reception signal Rx corresponding to the case in which the column of the matrix F is all 1 needs to be derived. However, the levels $E_{m,n-1}$ to $E_{m,n+1}$ can be separated and acquired as in the case of using the inverse matrix $F^{-1}$ of the matrix F to perform the recovery calculation.

Although the result obtained by amplifying the calculation result of Equation (8) by four times is acquired in Equation (14), the increase in the calculation result leads to an improvement in the accuracy of calculation in the later stage, and this is preferable. This similarly applies to the case of using the inverse matrix $F^{-1}$ of the matrix F to perform the recovery calculation. A specific example will be illustrated to describe this.

The vector $d_{series}$ of a case in which the matrix F is a 4×4 Walsh code is represented by the following Equation (15). Here, a vector e is a vector indicating the levels of the pen signal received by four loop coils LCx.

Math. 15

$$d_{series} = Fe = \begin{pmatrix} 1 & 1 & 1 & 1 \\ 1 & -1 & 1 & -1 \\ 1 & 1 & -1 & -1 \\ 1 & -1 & -1 & 1 \end{pmatrix}e \tag{15}$$

The inverse matrix $F^{-1}$ of the matrix F illustrated in Equation (15) is represented by Equation (16).

Math. 16

$$F^{-1} = \frac{1}{4}\begin{pmatrix} 1 & 1 & 1 & 1 \\ 1 & -1 & 1 & -1 \\ 1 & 1 & -1 & -1 \\ 1 & -1 & -1 & 1 \end{pmatrix} \tag{16}$$

Therefore, in the recovery calculation of the vector e, the inverse matrix $F^{-1}$ can be multiplied by 4 as illustrated in the following Equation (17) to obtain a vector in the level four times the original vector e even when the inverse matrix $F^{-1}$ is used to perform the recovery calculation.

Math. 17

$$4F^{-1}d_{series} = \begin{pmatrix} 1 & 1 & 1 & 1 \\ 1 & -1 & 1 & -1 \\ 1 & 1 & -1 & -1 \\ 1 & -1 & -1 & 1 \end{pmatrix}d_{series}$$

$$= \begin{pmatrix} 1 & 1 & 1 & 1 \\ 1 & -1 & 1 & -1 \\ 1 & 1 & -1 & -1 \\ 1 & -1 & -1 & 1 \end{pmatrix}\begin{pmatrix} 1 & 1 & 1 & 1 \\ 1 & -1 & 1 & -1 \\ 1 & 1 & -1 & -1 \\ 1 & -1 & -1 & 1 \end{pmatrix}e$$

$$= 4e \tag{17}$$

Next, the position detection system 1 according to a second embodiment of the present disclosure will be described.

Figure 18:
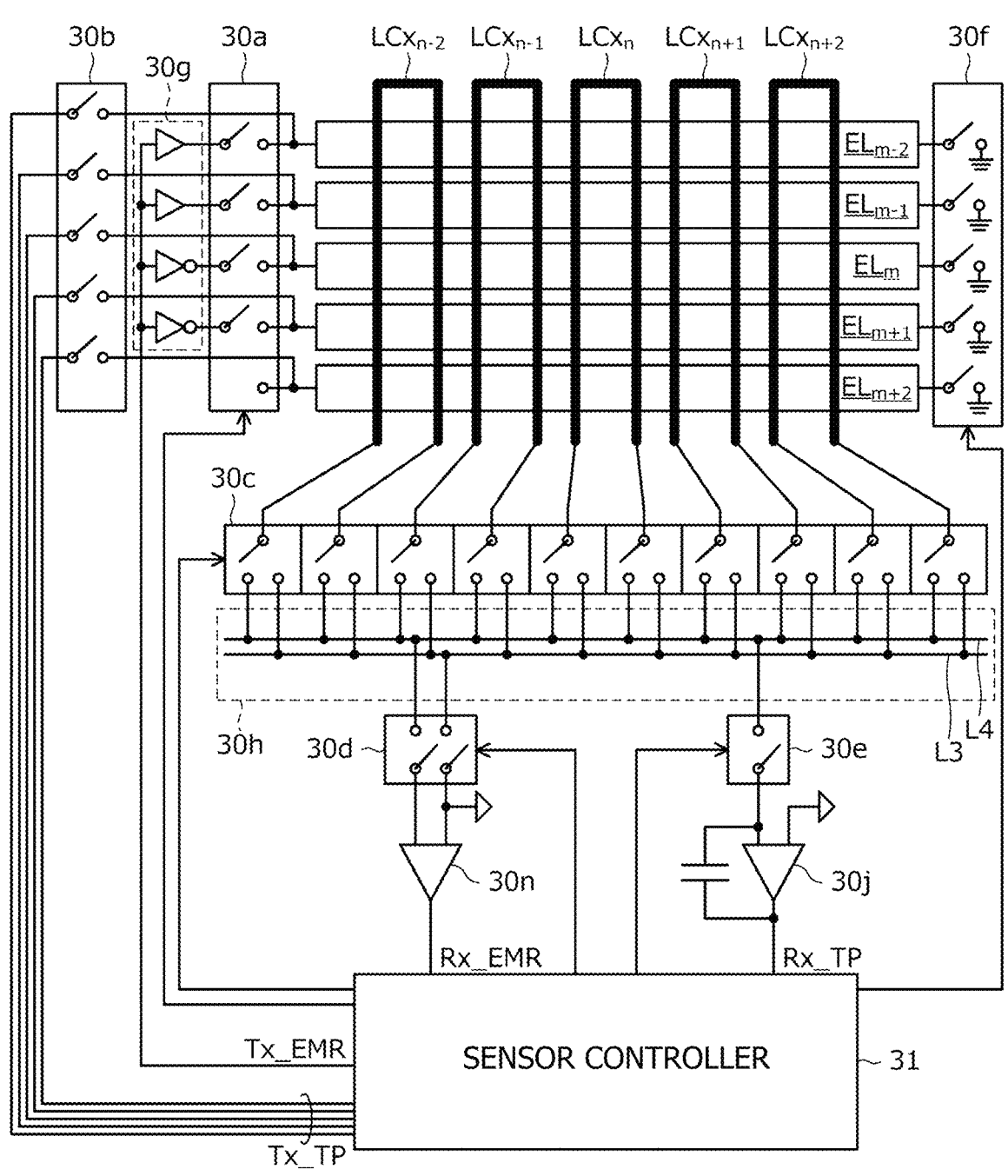
FIG. 18 is a diagram illustrating an internal configuration of the switch unit 30 arranged in a position detection apparatus 3 included in the position detection system 1 according to a second embodiment of the present disclosure.

FIG. 18 is a diagram illustrating an internal configuration of the switch unit 30 arranged in the position detection apparatus 3 included in the position detection system 1 according to the present embodiment. The switch unit 30 according to the present embodiment is different from the switch unit 30 according to the first embodiment in that the wiring unit 30h does not include the wires L1 and L2, the switch 30c does not include the output pins corresponding to the wires L1 and L2, and includes an op amp 30n in place of the differential amplifier 30i. The switch 30d according to the present embodiment plays a role of connecting the wire LA to the input terminal of the op amp 30n and connecting the wire L3 to the ground end according to the control of the sensor controller 31. In addition, the sensor controller 31 according to the present embodiment is different from the sensor controller 31 according to the first embodiment in that three loop coils LCx are connected to the op amp 30n in parallel, instead of in series, to detect the position of the electromagnetic resonance pen P. The position detection system 1 according to the present embodiment is similar to the position detection system 1 according to the first embodiment in other respects, and the description will be continued with a focus on the differences from the position detection system 1 according to the first embodiment.

Figure 19:
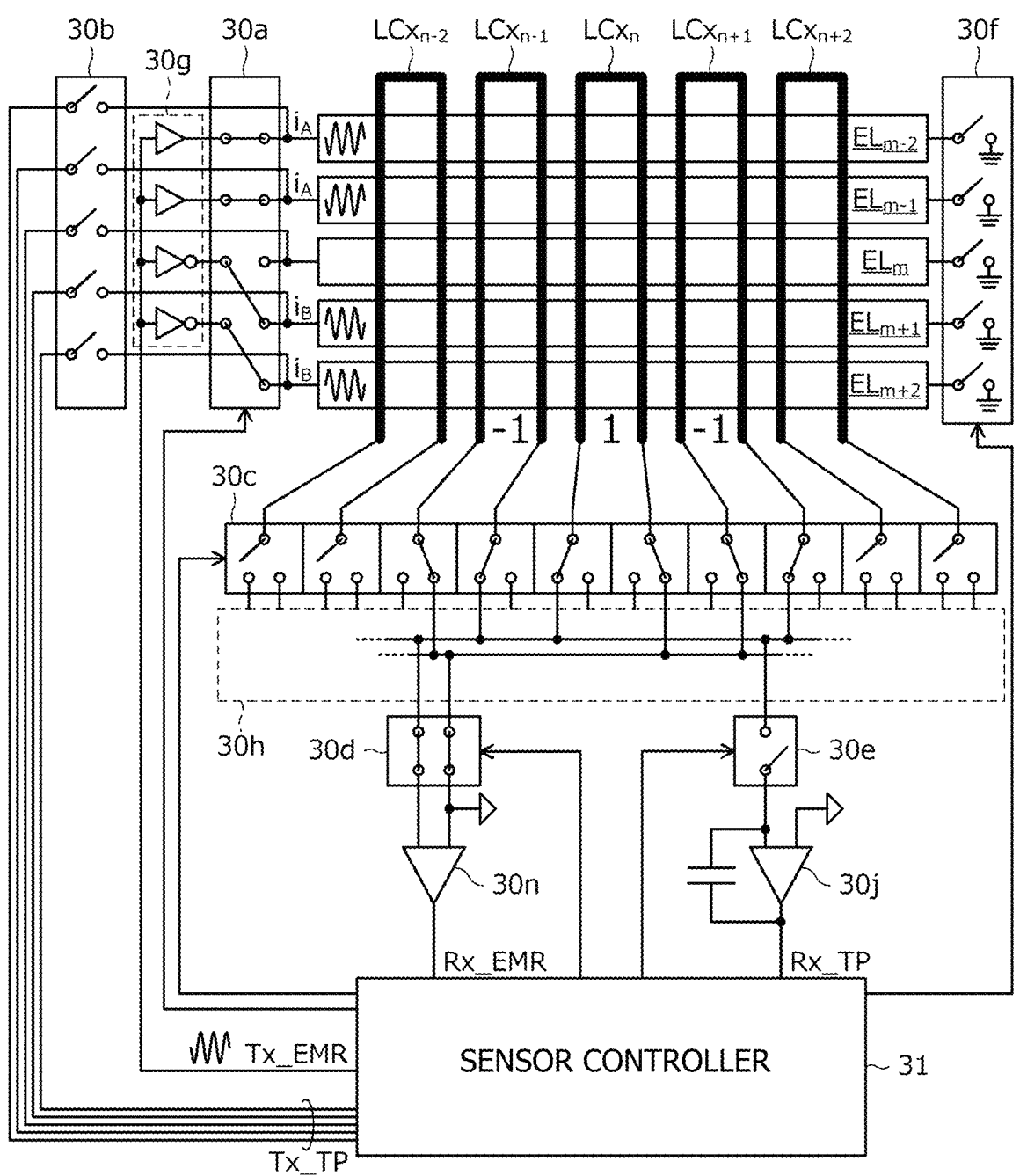
FIG. 19 is a diagram illustrating a state of the switch unit 30 when the sensor controller 31 detects the position of the electromagnetic resonance pen P.
Figure 20:
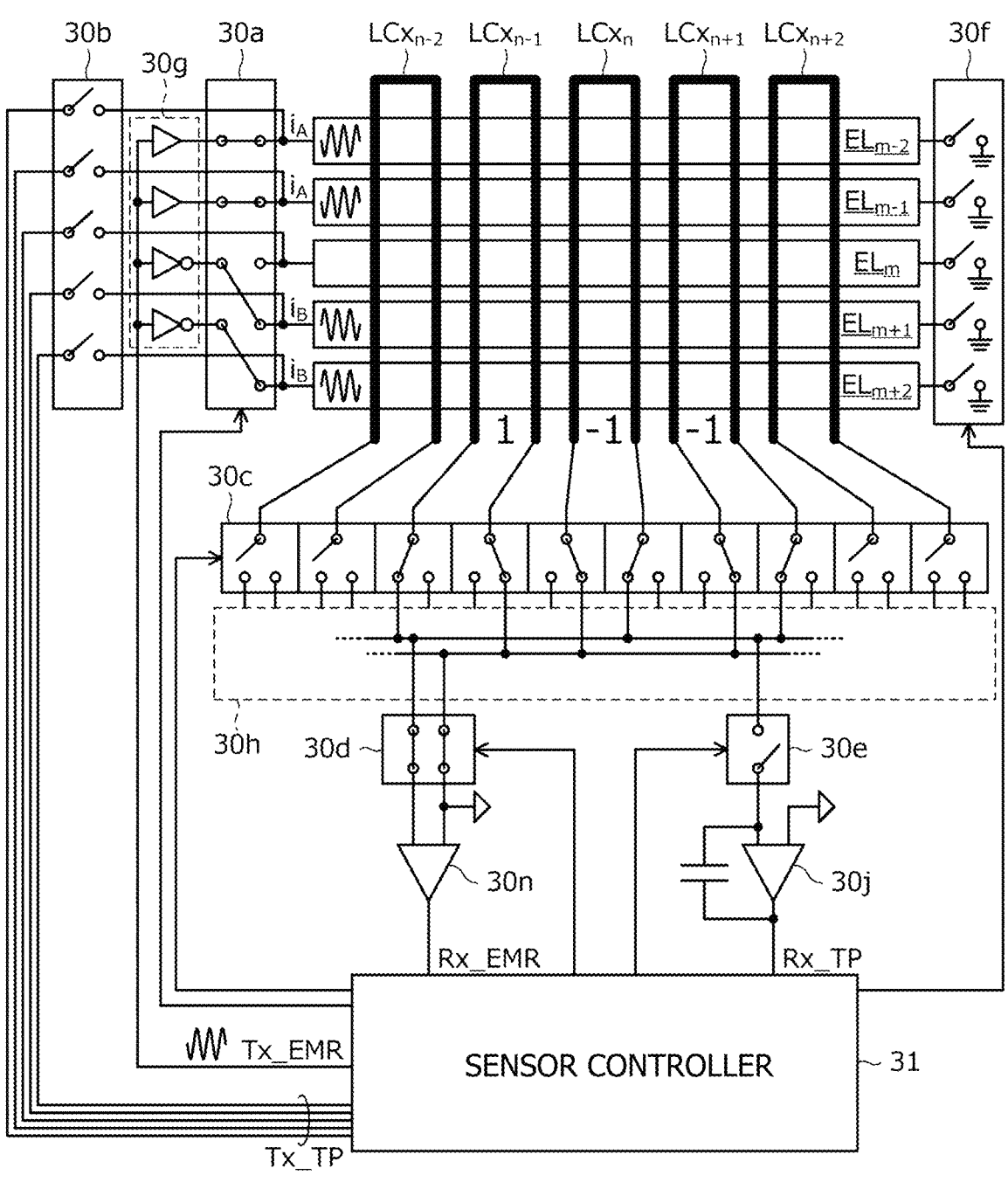
FIG. 20 is a diagram illustrating a state of the switch unit 30 when the sensor controller 31 detects the position of the electromagnetic resonance pen P.

FIGS. 19 to 21 are diagrams illustrating states of the switch unit 30 when the sensor controller 31 according to the present embodiment detects the position of the electromagnetic resonance pen P. While the sensor controller 31 according to the present embodiment exports the alternating magnetic field from the linear electrode $EL_m$, the sensor controller 31 executes a process of sequentially selecting sets of loop coils LCx, each set including three adjacent loop coils LCx, and each time the set is selected, controlling the switch 30c to connect the three loop coils LCx included in the selected set in parallel to the op amp 30n in three connection modes with different connection polarities. As a result of the process, the op amp 30n detects a result value indicating the level of the pen signal based on the potential (potential with respect to ground end) at one end of a composite coil including the three loop coils LCx connected in parallel and outputs the result value as the reception signal Rx_EMR to the sensor controller 31.

FIGS. 19 to 21 illustrate connections in the three connection modes. Specifically, in the example of FIG. 19, the loop coils $LCX_{n-1}$ and $LCx_{n+1}$ are connected counterclockwise (written as "−1" in FIG. 19), and the loop coil $LCx_n$ is connected clockwise (written as "1" in FIG. 19) as viewed from the input terminal of the op amp 30n. Furthermore, in the example of FIG. 20, the loop coil $LCX_{n-1}$ is connected clockwise, and the loop coils $LCX_n$ and $LCx_{n+1}$ are connected counterclockwise as viewed from the input terminal of the op amp 30n. In the example of FIG. 21, the loop coils $LCX_{n-1}$ and $LCX_n$ are connected counterclockwise, and the loop coil $LCX_{n+1}$ is connected clockwise as viewed from the input terminal of the op amp 30n.

As a result of the connections, the reception signal Rx_EMR supplied from the op amp 30n to the sensor controller 31 is represented by a vector $d_{parallel}$ illustrated in the following Equation (18). The meaning of the levels $E_{m,n-1}$ to $E_{m,n+1}$ illustrated in Equation (18) is as described in the first embodiment. As illustrated in the last line of Equation (18), the vector $d_{parallel}$ can also be transformed into a form of the product of the 3×3 matrix F indicating the connection polarity in each pen signal detection period and the vector representing the levels $E_{m,n-1}$ to $E_{m,n+1}$, as with the vector $d_{series}$ described in the first embodiment.

Math. 18

$$d_{parallel} = \begin{pmatrix} -E_{m,n-1} + E_{m,n} - E_{m,n+1} \\ +E_{m,n-1} - E_{m,n} - E_{m,n+1} \\ -E_{m,n-1} - E_{m,n} + E_{m,n+1} \end{pmatrix} \tag{18}$$
$$= \begin{pmatrix} -1 & 1 & -1 \\ 1 & -1 & -1 \\ -1 & -1 & 1 \end{pmatrix} \begin{pmatrix} E_{m,n-1} \\ E_{m,n} \\ E_{m,n+1} \end{pmatrix} = F \begin{pmatrix} E_{m,n-1} \\ E_{m,n} \\ E_{m,n+1} \end{pmatrix}$$

As can be understood from the fact that the shape of the vector $d_{parallel}$ is the same as the shape of the vector $d_{series}$, the sensor controller 31 in the present embodiment can also multiply the vector $d_{parallel}$ by the inverse matrix $F^{-1}$ of the matrix F to thereby separate and acquire the levels $E_{m,n-1}$ to $E_{m,n+1}$ of the pen signal received by the loop coils $LCx_{n-1}$ to $LCx_{n+1}$. Therefore, the reception method of the pen signal according to the present embodiment can also obtain advantageous effects similar to the advantageous effects of the first embodiment. Specifically, the increase in power consumption can be prevented even when the linear electrodes EL substitute the Tx coils. In addition, when the linear electrodes EL substitute the Tx coils, the reduction in noise superimposed on the alternating magnetic fields detected by the Rx coils (loop coils LCx) can also be reduced. Furthermore, the S/N ratio of the pen signal received by the sensor controller 31 can be improved without reducing the frequency of the position detection and without increasing the circuit scale of the sensor controller 31. However, in relation to this, the inductance in the case of connecting the plurality of loop coils LCx in parallel is smaller than in the case of connecting the plurality of loop coils LCx in series, and the level of the pen signal in the present embodiment is smaller than that of the first embodiment. Therefore, it can be stated that the advantageous effect of improving the S/N ratio of the pen signal is higher in the first embodiment than in the present embodiment.

Next, the position detection system 1 according to a third embodiment of the present disclosure will be described.

Figure 22:
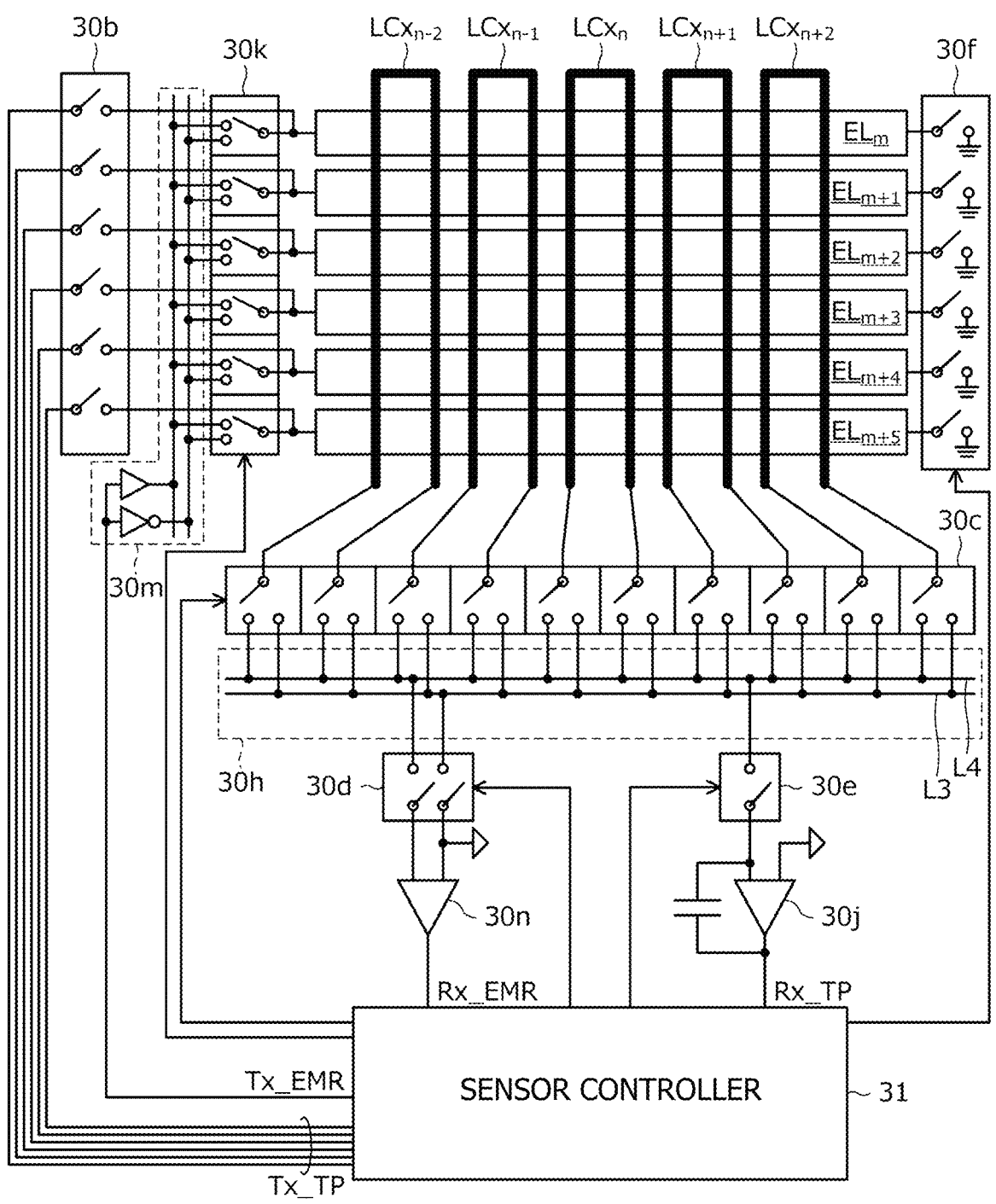
FIG. 22 is a diagram illustrating an internal configuration of the switch unit 30 arranged in the position detection apparatus 3 included in the position detection system 1 according to a third embodiment of the present disclosure.

FIG. 22 is a diagram illustrating an internal configuration of the switch unit 30 arranged in the position detection apparatus 3 included in the position detection system 1 according to the present embodiment. For the simplification, FIG. 22 illustrates only five loop coils LCx (loop coils $LCX_{n-2}$ to $LCX_{n+2}$) and six linear electrodes EL (linear electrodes $EL_m$ to $EL_{m+5}$). This is also similar in FIGS. 23 to 25 described later.

The switch unit 30 according to the present embodiment is different from the switch unit 30 according to the second embodiment in that the switch unit 30 according to the present embodiment includes a switch 30k in place of the switch 30a and includes a drive circuit 30m in place of the drive circuit 30g. In addition, the sensor controller 31 according to the present embodiment is different from the sensor controller 31 according to the second embodiment in that the sensor controller 31 according to the present embodiment supplies the alternating current to the six linear electrodes $EL_m$ to $EL_{m+5}$ at the same time and connects only one loop coil LCx to the op amp 30n at the same time to detect the position of the electromagnetic resonance pen P. The position detection system 1 according to the present embodiment is similar to the position detection system 1 according to the second embodiment in other respects, and the description will be continued with a focus on the differences from the position detection system 1 according to the second embodiment.

The switch 30k is configured to supply the alternating current Tx_EMR for generating the alternating magnetic field on the touch surface to the plurality of linear electrodes EL. The switch 30*k* includes output pins corresponding to the linear electrodes EL, and two input pins are provided for each output pin. Each output pin is connected to one end of the corresponding linear electrode EL in the x direction (longitudinal direction). The switch 30*k* plays a role of connecting each input pin to one of the output pins in each linear electrode EL according to the control of the sensor controller 31.

The drive circuit 30*m* is a circuit that generates the alternating currents $i_A$ and $i_B$ according to the alternating current Tx_EMR supplied from the sensor controller 31 and that supplies the alternating currents $i_A$ and $i_B$ to the linear electrodes EL through the switch 30*k*. The drive circuit 30*m* is configured to supply the alternating current i to one of the two input pins corresponding to each linear electrode EL and supply the alternating current is to the other input pin.

Figure 23:
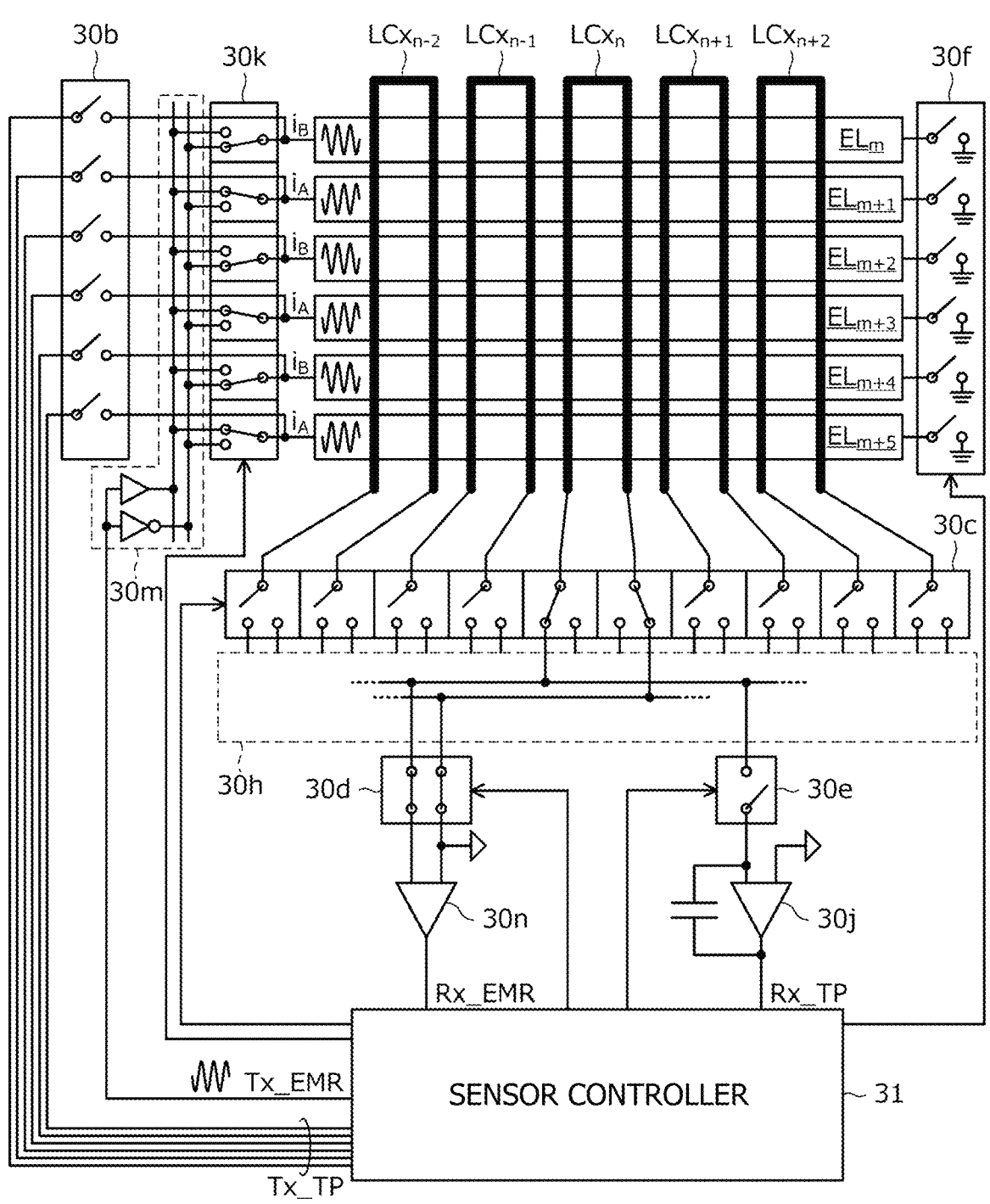
FIG. 23 is a diagram illustrating a state of the switch unit 30 when the sensor controller 31 detects the position of the electromagnetic resonance pen P.
Figure 24:
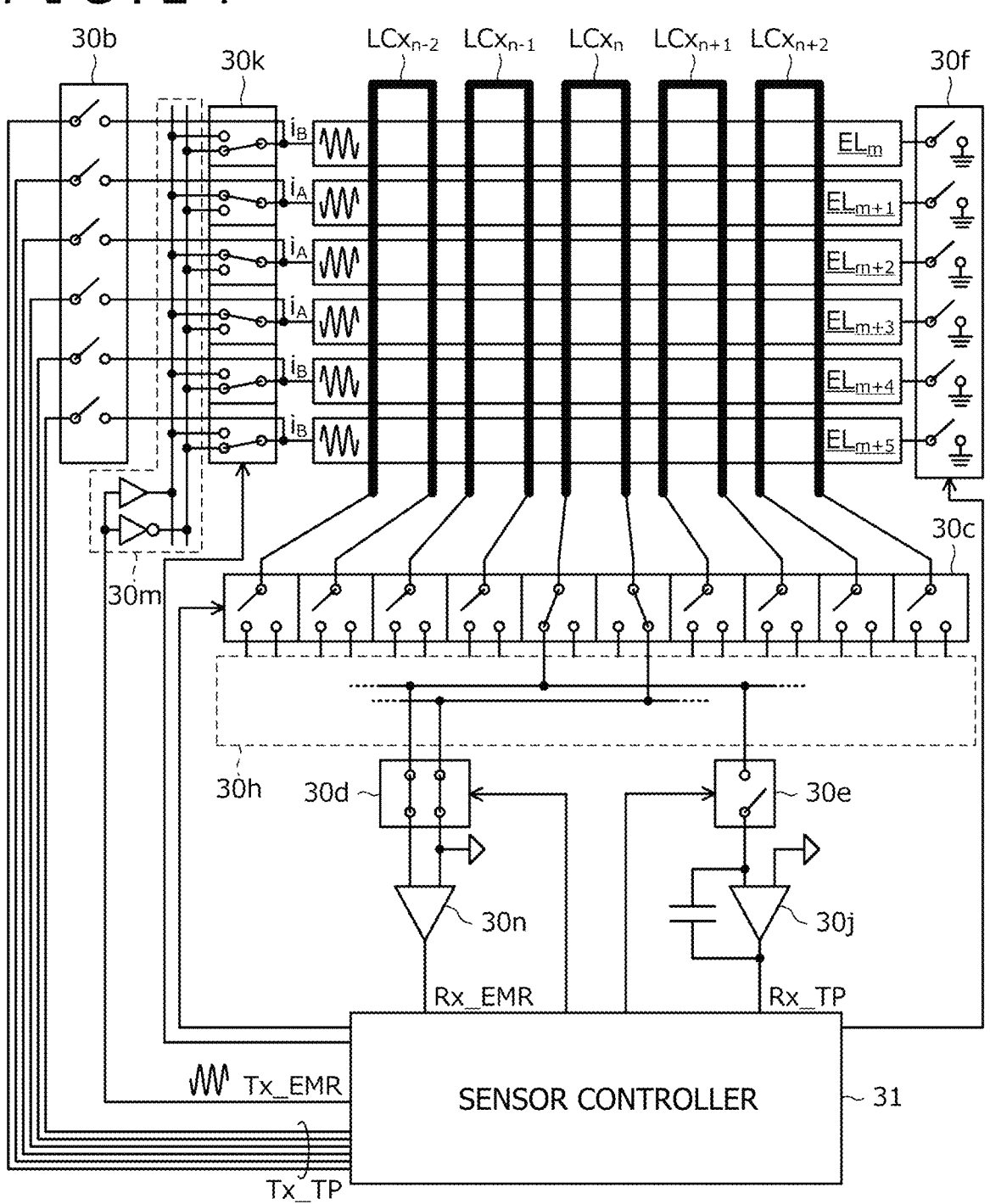
FIG. 24 is a diagram illustrating a state of the switch unit 30 when the sensor controller 31 detects the position of the electromagnetic resonance pen P.
Figure 25:
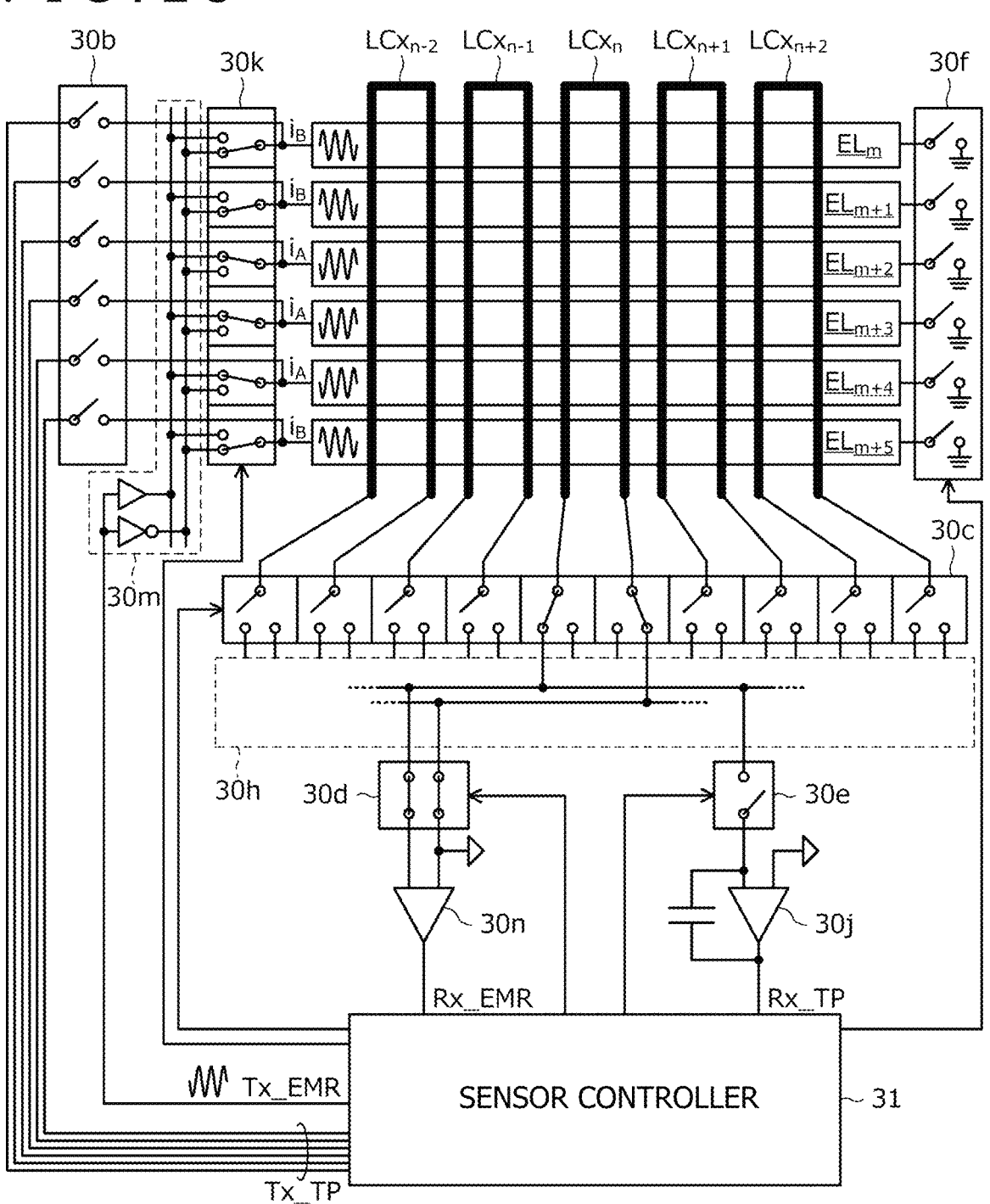
FIG. 25 is a diagram illustrating a state of the switch unit 30 when the sensor controller 31 detects the position of the electromagnetic resonance pen P.

FIGS. 23 to 25 are diagrams illustrating states of the switch unit 30 when the sensor controller 31 according to the present embodiment detects the position of the electromagnetic resonance pen P. While the loop coil $LCx_n$ is connected to the op amp 30*n* according to the control of the switches 30*c* to 30*e*, the sensor controller 31 according to the present embodiment sequentially selects six adjacent linear electrodes EL while shifting the target by three linear electrodes EL at a time. Each time, the sensor controller 31 executes a process of controlling the switch 30*c* to connect the selected six linear electrodes EL to the drive circuit 30*m* in three connection modes such that the alternating current $i_A$ is generated in half the six linear electrodes EL and the alternating current $i_B$ is generated in the remaining half.

FIGS. 23 to 25 illustrate the supply of the alternating currents in the three connection modes. Specifically, the alternating current $i_A$ is supplied to the linear electrodes $EL_{m+1}$, $EL_{m+3}$, and $EL_{m+5}$, and the alternating current $i_B$ is supplied to the linear electrodes $EL_m$, $EL_{m+2}$, and $EL_{m+4}$ in the example of FIG. 23. In addition, the alternating current $i_A$ is supplied to the linear electrodes $EL_{m+1}$ to $EL_{m+3}$, and the alternating current $i_B$ is supplied to the linear electrodes $EL_m$, $EL_{m+4}$, and $EL_{m+5}$ in the example of FIG. 24. The alternating current $i_A$ is supplied to the linear electrodes $EL_{m+2}$ to $EL_{m+4}$, and the alternating current $i_B$ is supplied to the linear electrodes $EL_m$, $EL_{m+1}$, and $EL_{m+5}$ in the example of FIG. 25.

FIGS. 26(*a*) to 26(*c*) are diagrams schematically illustrating methods of supplying the alternating currents in FIGS. 23 to 25, respectively. FIGS. 26(*d*) to 26(*f*) are diagrams illustrating equivalent circuits when the methods illustrated in FIGS. 26(*a*) to 26(*c*) are used to supply the alternating currents $i_A$ and is to the six linear electrodes $EL_m$ to $EL_{m+5}$, respectively. As illustrated in FIGS. 26(*a*) to 26(*f*), when the alternating currents in which the phases of time derivatives are opposite are applied to a linear electrode $EL_{m+k}$ (k is one of 0, 1, and 2) and a linear electrode $EL_{m+k+3}$, it can be assumed that the linear electrode $EL_{m+k}$ and the linear electrode $EL_{m+k+3}$ form a loop coil regardless of the current flowing through the linear electrodes $EL_{m+k+1}$ and $EL_{m+k+2}$ positioned between the linear electrode $EL_{m+k}$ and the linear electrode $EL_{m+k+3}$. Hereinafter, the loop coil will be referred to as a "pseudo loop coil PLC," and particularly, the pseudo loop coil PLC formed by the linear electrodes $EL_{m+k}$ and $EL_{m+k+3}$ will be referred to as a "pseudo loop coil $PLC_{m+k}$." The connection polarity of the pseudo loop coil $PLC_{m+k}$ in the case of supplying the alternating current $i_A$ to the linear electrode $EL_{m+k}$ and supplying the alternating current is to the linear electrode $EL_{m+k+3}$ (written as "−" in FIGS. 26(*a*) to 26(*f*)) and the connection polarity of the pseudo loop coil $PLC_{m+k}$ in the case of supplying the alternating current i to the linear electrode $EL_{m+k}$ and supplying the alternating current $i_A$ to the linear electrode $EL_{m+k+3}$ (written as "+" in FIGS. 26(*a*) to 26(*f*)) are opposite.

The level of the pen signal received by the loop coil $LCx_n$ when the alternating current $i_A$ is supplied to the linear electrode $EL_{m+k}$ and the alternating current $i_B$ is supplied to the linear electrode $EL_{m+k+3}$ is represented by $E_{m+k,n}$. The reception signal Rx_EMR (result value) supplied from the op amp 30*n* to the sensor controller 31 when the alternating currents are supplied as illustrated in FIG. 26(*a*) is represented by $-E_{m,n}+E_{m+1,n}-E_{m+2,n}$. This is similar when the alternating currents are supplied as illustrated in FIGS. 26(*b*) and 26(*c*), and the reception signals Rx_EMR are represented by $E_{m,n}-E_{m+1,n}-E_{m+2,n}$ and $-E_{m,n}-E_{m+1,n}+E_{m+2,n}$, respectively. When this is expressed by a vector format, this is represented by a vector dix illustrated in the following Equation (19). Furthermore, the vector dix can be transformed into a form of the product of the 3×3 matrix F indicating the connection polarity of the pseudo loop coil PLC and the vector representing the levels $E_{m,n}$ to $E_{m+2,n}$, as with the vector $d_{series}$ and the vector $d_{parallel}$.

Math. 19

$$d_{tx} =$$

$$\begin{pmatrix} -E_{m,n} + E_{m+1,n} - E_{m+2,n} \\ +E_{m,n} - E_{m+1,n} + E_{m+2,n} \\ -E_{m,n} - E_{m+1,n} + E_{m+2,n} \end{pmatrix} = \begin{pmatrix} -1 & 1 & -1 \\ 1 & -1 & -1 \\ -1 & -1 & 1 \end{pmatrix} \begin{pmatrix} E_{m,n} \\ E_{m+1,n} \\ E_{m+2,n} \end{pmatrix} = F \begin{pmatrix} E_{m,n} \\ E_{m+1,n} \\ E_{m+2,n} \end{pmatrix} \tag{19}$$

As can be understood from the fact that the vector dix is in the same form as the vector $d_{series}$ and the vector $d_{parallel}$, the sensor controller 31 in the present embodiment can also multiply the vector $d_{tx}$ by the inverse matrix $F^{-1}$ of the matrix F to separate and acquire the levels $E_{m,n}$, $E_{m+1,n}$, and $E_{m+2,n}$ of the pen signal received when the alternating magnetic fields are exported from the pseudo loop coils $PLC_m$ to $PLC_{m+2}$, respectively. Furthermore, according to the method of supplying the alternating currents of the present embodiment, the length of the period that the alternating magnetic field is exported from each pseudo loop coil PLC is three times longer than in the case of independently exporting the alternating magnetic fields from three pseudo loop coils PLC. While the level of the received pen signal is increased by 3 times, the level of the received noise is increased by just $3^{1/2}$ times. Therefore, it can be stated that the method of supplying the alternating currents according to the present embodiment can also improve the S/N ratio of the pen signal received by the sensor controller 31.

Figure 27:
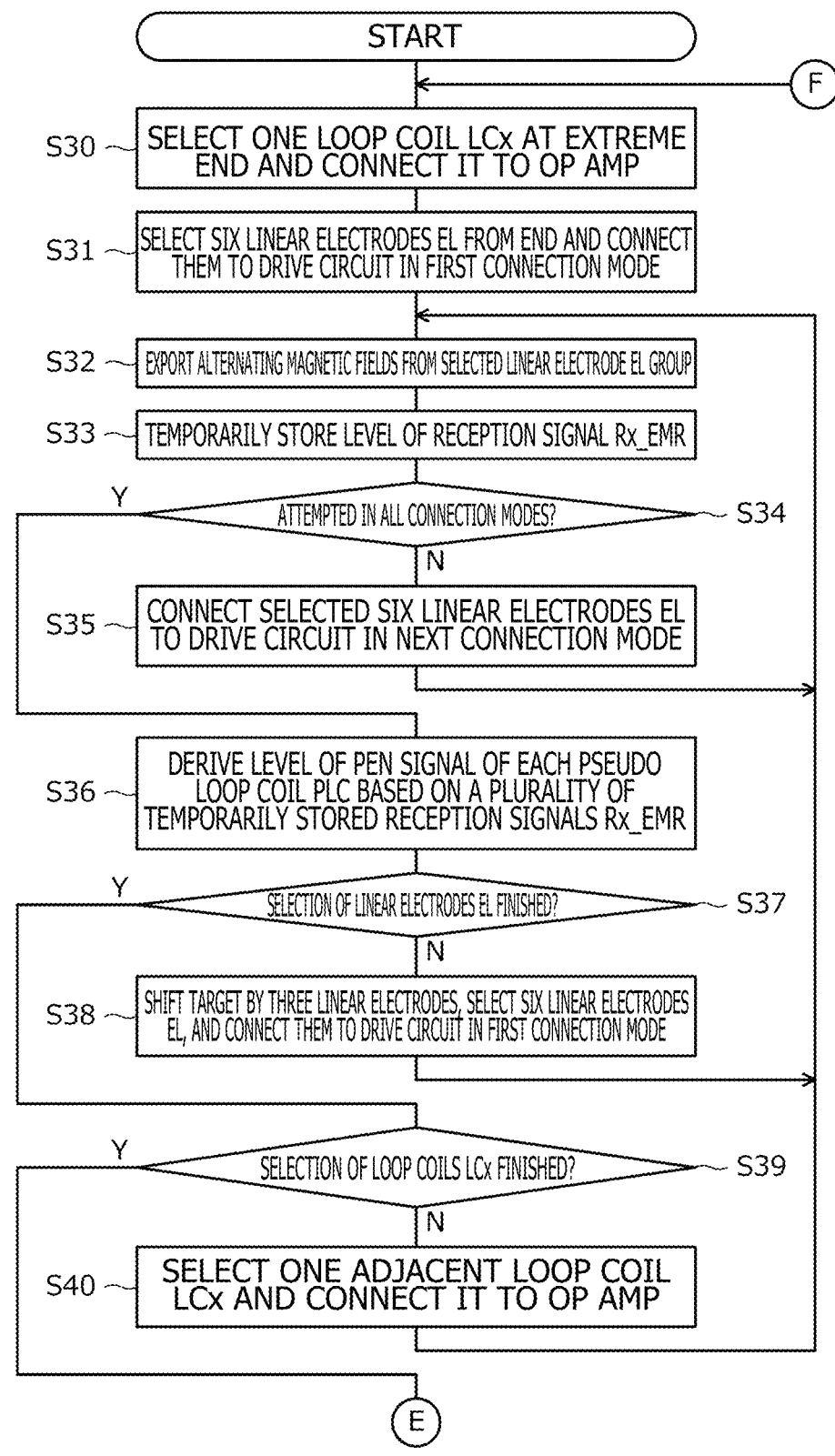
FIG. 27 is a flow diagram illustrating an entire flow of the position detection of the electromagnetic resonance pen P executed by the sensor controller 31.
Figure 29:
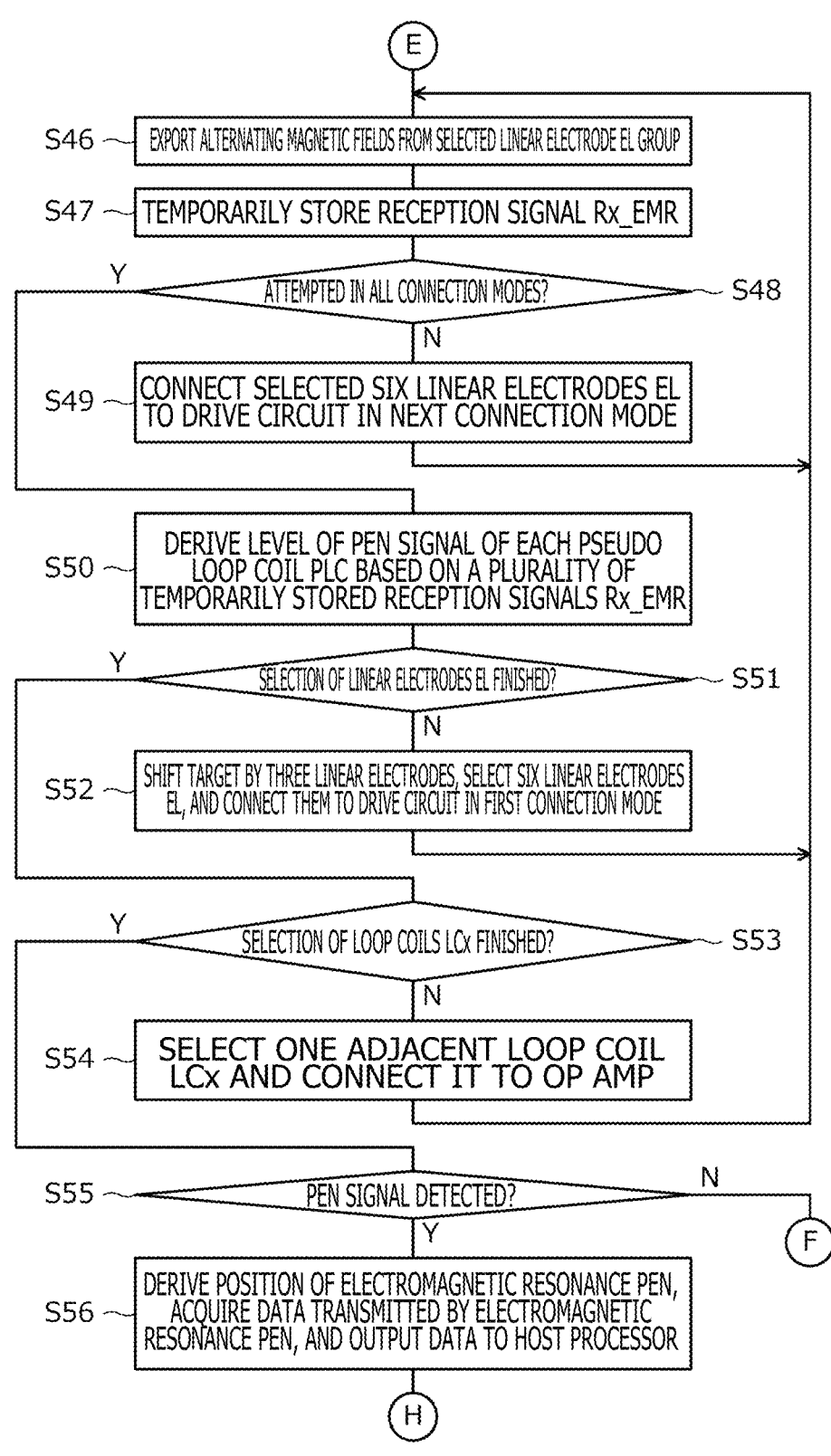
FIG. 29 is a flow diagram illustrating the entire flow of the position detection of the electromagnetic resonance pen P executed by the sensor controller 31.

FIGS. 27 to 29 are flow diagrams illustrating the entire flow of the position detection of the electromagnetic resonance pen P executed by the sensor controller 31 according to the present embodiment. First, in FIG. 27, the sensor controller 31 before detecting the electromagnetic resonance pen P selects one loop coil LCx at the extreme end and controls the switch 30*b* to connect the selected loop coil LCx to the op amp 30*n* (S30). The process also includes a process of controlling the switch 30*d* to connect the wire LA to the op amp 30*n* and ground the wire L3 and controlling the switch 30*e* to cut off the op amp 30*j* from the wire LA.

Next, the sensor controller 31 selects six linear electrodes EL from the end and controls the switch 30*k* to connect the six linear electrodes EL to the drive circuit 30*m* in one connection mode (for example, connection mode illustrated in FIG. 23) (S31). The process also includes a process of controlling the switch 30f to ground the other end of each linear electrode EL in the x direction and a process of controlling the switch 30b to prevent supplying the touch detection signal Tx_TP to each linear electrode EL.

Next, the sensor controller 31 starts to export the alternating magnetic fields from the selected linear electrode EL group (S32). Specifically, the sensor controller 31 starts to supply the alternating current Tx_EMR to the drive circuit 30m. In this way, one of the alternating currents $i_A$ and $i_B$ flows through each of the six linear electrodes EL. As a result, the pseudo loop coil PLC is formed, and the alternating magnetic fields are exported. Subsequently, the sensor controller 31 temporarily stores the level of the reception signal Rx_EMR output from the op amp 30n according to the alternating magnetic fields exported at S32 (S33). The specific details of the level stored here may be similar to the level stored at S5 of FIG. 15.

Next, the sensor controller 31 determines whether or not the process of S32 and S33 has been attempted in all of the connection modes (S34). Specifically, the sensor controller 31 determines whether or not the process of S32 and S33 has been attempted in all of the three connection modes illustrated in FIGS. 23 to 25. The sensor controller 31 that has determined that the process has not been attempted in all of the connection modes in the determination controls the switch 30k to connect the selected six linear electrodes EL to the drive circuit 30m in the next connection mode (for example, the connection mode illustrated in FIG. 24 after the connection mode illustrated FIG. 23 or the connection mode illustrated in FIG. 25 after the connection mode illustrated in FIG. 24) (S35) and returns to S32.

On the other hand, the sensor controller 31 that has determined that the process has been attempted in all of the connection modes at S34 derives the level of the pen signal of each pseudo loop coil PLC based on the levels of the plurality of reception signals Rx_RMP temporarily stored in the plurality of attempts of S5 (S36). Specifically, the sensor controller 31 performs calculation (recovery calculation) of multiplying the vector dix by the inverse matrix $F^{-1}$ of the matrix F.

Next, the sensor controller 31 determines whether or not the selection of all of the linear electrodes EL is finished (S37). If the sensor controller 31 determines that the selection is not finished, the sensor controller 31 shifts the target by three linear electrodes and selects six linear electrodes EL. The sensor controller 31 controls the switch 30k to connect the six linear electrodes EL to the drive circuit 30m in the first connection mode (for example, connection mode illustrated in FIG. 23) (S38) and then returns to S32. On the other hand, if the sensor controller 31 determines that the selection is finished at S37, the sensor controller 31 determines whether or not the selection of all of the loop coils LCx is finished (S39). If the sensor controller 31 determines that the selection is not finished, the sensor controller 31 selects one loop coil LCx adjacent to one loop coil LCx selected last time (loop coil LCx selected at S30 or S40) and controls the switch 30c to connect the loop coil LCx to the op amp 30n (S40). The sensor controller 31 returns to S32.

The sensor controller 31 that has determined that the selection is finished at S39 determines whether or not the pen signal is detected based on the level of the pen signal in each combination of the pseudo loop coil PLC and the loop coil LCx obtained by repeating S36 (S41 of FIG. 28). In one example, the result of the determination is affirmative when there is a level exceeding a predetermined value, and the result of the determination is negative in other cases.

The sensor controller 31 that has determined that the pen signal is not detected at S41 returns to S30 of FIG. 27 and continues the process. On the other hand, the sensor controller 31 that has determined that the pen signal is detected derives the position of the electromagnetic resonance pen P based on the level of the pen signal in each combination of the pseudo loop coil PLC and the loop coil LCx derived at S36 of FIG. 27 and outputs the position to the host processor 32 (S42).

Next, the sensor controller 31 determines, as selection targets, 3+3n (n is a natural number which is typically n=1, where 3+3n is a number smaller than the total number of linear electrodes EL) linear electrodes EL (linear electrode set) and a predetermined number of (a number smaller than the total number of loop coils LCx, which is typically three or four) loop coils LCx based on the position derived at S42 (position derived at S56 of the last time in the case of transition from S56 described later) (S43).

Next, the sensor controller 31 selects the loop coil LCx at the extreme end among the loop coils LCx as the selection targets and controls the switch 30c to connect the loop coil LCx to the op amp 30n (S44). In addition, the sensor controller 31 selects six linear electrodes EL from the end among the linear electrodes EL as the selection targets and controls the switch 30k to connect the selected six linear electrodes EL to the drive circuit 30m in the first connection mode (for example, connection mode illustrated in FIG. 23) (S45).

In FIG. 29, the sensor controller 31 executes a process similar to S32 to S41 of FIGS. 27 and 28 (S46 to S55). However, the process here is different from the process of S32 to S41 in that while only the level of the reception signal Rx_EMR is temporarily stored at 33, a series of digital values (obtained by sampling) included in the reception signal Rx_EMR are also stored at S47. The processes are different in that while whether or not the selection of all of the linear electrodes EL is finished is determined at S37, whether or not the selection of all of the linear electrodes EL determined to be the selection targets in S43 is finished is determined at S51. The processes are different in that while whether or not the selection of all of the loop coils LCx is finished is determined at S39, whether or not the selection of all of the loop coils LCx determined to be the selection targets at S43 is determined at S53.

The sensor controller 31 that has determined that the pen signal is detected at S55 derives the position of the electromagnetic resonance pen P, acquires the data transmitted by the electromagnetic resonance pen P, and outputs the data to the host processor 32 (S56). Specifically, the sensor controller 31 derives the position of the electromagnetic resonance pen P based on the level of the pen signal in each combination of the pseudo loop coil PLC and the loop coil LCx derived at S50. In addition, the sensor controller 31 demodulates the series of digital values stored at S47 in relation to the combination of the pseudo loop coil PLC and the loop coil LCx closest to the derived position to thereby acquire the data transmitted by the electromagnetic resonance pen P. After the end of S56, the sensor controller 31 returns to S43 and continues the process.

When the process is adopted, the sensor controller 31 according to the present embodiment can specify the linear electrode set once at S43 of FIG. 28 and then export the alternating magnetic fields from only a predetermined number of linear electrodes EL included in the linear electrode set to thereby update the two-dimensional position of the electromagnetic resonance pen P. This can prevent the increase in power consumption even when the linear electrodes EL substitute the Tx coils.

As described above, the position detection system 1 according to the present embodiment can specify the linear electrode set once and then export the alternating magnetic fields only from a predetermined number of linear electrodes EL included in the linear electrode set to thereby update the two-dimensional position of the electromagnetic resonance pen P. This can prevent the increase in power consumption even when the linear electrodes EL substitute the Tx coils.

In addition, the position detection system 1 according to the present embodiment also supplies the alternating currents $i_A$ and $i_B$ is to one ends (end portions on the same side) of the linear electrodes EL in the x direction, and the position detection system 1 can prevent the occurrence of phase shift between the currents flowing through the linear electrodes EL. This can also reduce the noise superimposed on the alternating magnetic fields detected by the Rx coils (loop coils LCx) when the linear electrodes EL substitute the Tx coils.

Although the preferred embodiments of the present disclosure have been described, the present disclosure is not limited to the embodiments in any way, and it is obvious that the present disclosure can be carried out in various modes without departing from the scope of the present disclosure.

For example, the example of generating the reception signal Rx_EMR based on the potential between both ends of the composite coil including three loop coils LCx connected in series is described in the first embodiment, and the example of generating the reception signal Rx_EMR based on the potential (potential with respect to ground end) at one end of the composite coil including three coils LCx connected in parallel is described in the second embodiment. However, when three loop coils LCx are connected in series, the reception signal Rx_EMR may be generated based on the potential (potential with respect to ground end) at one end of the composite coil including the three loop coils LCx. When three loop coils LCx are connected in parallel, the reception signal Rx_EMR may be generated based on the potential between both ends of the composite coil including the three loop coils LCx.

In addition, although the examples of using three adjacent loop coils LCx as one set to detect the position of the electromagnetic resonance pen P are described in the first and second embodiments, two adjacent loop coils LCx may be used as one set, or four or more adjacent loop coils LCx may be used as one set. Alternatively, all of the loop coils LCx may be used as one set. The matrix F in a case of using n (n≥2) loop coils LCx as one set is an n×n matrix.

In addition, although the examples of generating the reception signal Rx_EMR while using the switch 30c to change the connection modes of the plurality of loop coils LCx are described in the first and second embodiments, the reception signal Rx_EMR may be generated while changing the connection of the loop coils LCx and calculation circuits. For example, in the pen signal detection period T1 illustrated in FIG. 11, the loop coils $LCX_{n-1}$ and $LCx_{n+1}$ can be connected to a subtraction circuit, and the loop coil $LCX_n$ can be connected to an addition circuit. In the pen signal detection period T2, the loop coils $LCX_n$ and $LCX_{n+1}$ can be connected to the subtraction circuit, and the loop coil $LCX_{n-1}$ can be connected to the addition circuit. In the pen signal detection period T3, the loop coil $LCx_n$ can be connected to the subtraction circuit, and the loop coils $LCx_{n-1}$ and $LCX_{n+1}$ can be connected to the addition circuit.

In addition, the technique of the present disclosure may be applied to generate the reception signal Rx_EMR corresponding to any connection mode of the loop coils LCx. For example, a difference $E_{M,1}-E_{m,2}$ between the loop coil $LCx_1$ and the loop coil $LCx_2$ or a signal $(E_{m,1}+E_{m,2})-(E_{m,3}+E_{m,4})$ obtained by subtracting an addition signal of the loop coil $LCx_3$ and the loop coil $LCx_4$ from an addition signal of the loop coil $LCx_1$ and the loop coil $LCx_2$ may be generated. In this way, the level of the pen signal corresponding to any connection mode of the loop coils LCx can be acquired.

DESCRIPTION OF REFERENCE SYMBOLS

1: Position detection system
3: Position detection apparatus
30: Switch unit
30a to 30f, 30k: Switch
30g, 30m: Drive circuit
30h: Wiring unit
30i: Differential amplifier
30j, 30n: Op amp
31: Sensor controller
32: Host processor
EL Linear electrode
F: Finger
L1 to LA: Wire
LCx: Loop coil
P: Electromagnetic resonance pen
PA1, PA2: Probing area
PLC: Pseudo loop coil
T1 to T3: Pen signal detection period
Tx, Tx_EMR: Alternating current
Tx_TP: Touch detection signal
Rx, Rx_EMR, Rx_TP: Reception signal The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor apparatus that detects an indicator, the sensor apparatus comprising:
   a linear electrode group extended in parallel;
   a detection coil group crossing the linear electrode group; and
   an integrated circuit connected to the linear electrode group and the detection coil group, wherein
   the integrated circuit, in operation:
      sequentially sends alternating magnetic fields from the linear electrode group, uses the detection coil group to detect an alternating magnetic field generated by the indicator according to the alternating magnetic fields, and determines a linear electrode set including part of the linear electrode group based on a result of detecting the alternating magnetic field generated by the indicator, executes a process of sending the alternating magnetic fields from at least part of the linear electrode set for a plurality of times, the process including selecting a predetermined number of linear electrodes from a plurality of linear electrodes included in the linear electrode set and supplying a first alternating current to half of the predetermined number of linear electrodes and supplying a second alternating current different from the first alternating current to the predetermined number of linear electrodes other than the half of the predetermined number of linear electrodes at a same time, wherein the first alternating current and the second alternating current are generated to satisfy a relation that phases of time derivatives of the first alternating current and the second alternating current are opposite;

uses a plurality of result values detected by at least part of the detection coil group as a result of executing the process to derive a two-dimensional position of the indicator; and updates the linear electrode set according to the two-dimensional position.

2. The sensor apparatus according to claim 1, wherein the two-dimensional position includes a position in a first direction in which linear electrodes included in the linear electrode group are lined up, and a position in a second direction in which coils included in the detection coil group are lined up.

3. The sensor apparatus according to claim 1, wherein while the process of sending the alternating magnetic fields from at least part of the linear electrode set is executed for the plurality of times, the linear electrode set is not used to detect the alternating magnetic field generated by the indicator.

4. The sensor apparatus according to claim 1, wherein the integrated circuit executes the process of sending the alternating magnetic fields from at least part of the linear electrode set for the plurality of times while changing a combination of linear electrodes supplied with the first alternating current among the predetermined number of linear electrodes and linear electrodes supplied with the second alternating current among the predetermined number of linear electrodes.

5. The sensor apparatus according to claim 1, wherein the process of sending the alternating magnetic fields in at least part of the linear electrode set includes: selecting one of a plurality of linear electrodes included in the linear electrode set, and supplying a first alternating current to one or more linear electrodes adjacent to each other on one side of the one of the plurality of linear electrodes and supplying a second alternating current different from the first alternating current to one or more linear electrodes adjacent to each other on another side of the one of the plurality of linear electrodes at a same time.

6. An integrated circuit connected to a linear electrode group extended in parallel and a detection coil group crossing the linear electrode group, the integrated circuit comprising:

at least one processor; and at least one memory storing instructions that, when executed by the at least one processor, cause the integrated circuit to:

detect an indicator;

sequentially send alternating magnetic fields from the linear electrode group, use the detection coil group to detect an alternating magnetic field generated by the indicator according to the alternating magnetic fields;

determine a linear electrode set including part of the linear electrode group based on a result of detecting the alternating magnetic field generated by the indicator;

execute a process of sending alternating magnetic fields from at least part of the linear electrode set for a plurality of times, the process including selecting a predetermined number of linear electrodes from a plurality of linear electrodes included in the linear electrode set and supplying a first alternating current to half of the predetermined number of linear electrodes and supplying a second alternating current different from the first alternating current to the predetermined number of linear electrodes other than the half of the predetermined number of linear electrodes at a same time, wherein the first alternating current and the second alternating current are generated to satisfy a relation that phases of time derivatives of the first alternating current and the second alternating current are opposite;

use a plurality of result values detected by at least part of the detection coil group as a result of executing the process to derive a two-dimensional position of the indicator; and update the linear electrode set according to the two-dimensional position.

7. A method of detecting an indicator by using a linear electrode group extended in parallel and a detection coil group crossing the linear electrode group, the method comprising:

sequentially sending alternating magnetic fields from the linear electrode group;

using the detection coil group to detect an alternating magnetic field generated by the indicator according to the alternating magnetic fields;

determining a linear electrode set including part of the linear electrode group based on a result of detecting the alternating magnetic field;

executing a process of sending alternating magnetic fields from at least part of the linear electrode set for a plurality of times, the process including selecting a predetermined number of linear electrodes from a plurality of linear electrodes included in the linear electrode set and supplying a first alternating current to half of the predetermined number of linear electrodes and supplying a second alternating current different from the first alternating current to the predetermined number of linear electrodes other than the half of the predetermined number of linear electrodes at a same time, wherein the first alternating current and the second alternating current are generated to satisfy a relation that phases of time derivatives of the first alternating current and the second alternating current are opposite;

using a plurality of result values detected by at least part of the detection coil group as a result of the executing the process to derive a two-dimensional position of the indicator; and updating the linear electrode set according to the two-dimensional position.

* * * * *